United States Patent
St. Amant

(10) Patent No.: US 12,073,641 B2
(45) Date of Patent: Aug. 27, 2024

(54) SYSTEMS, DEVICES, AND/OR PROCESSES FOR DYNAMIC SURFACE MARKING

(71) Applicant: Arm Limited, Cambridge (GB)

(72) Inventor: Renee Marie St. Amant, Austin, TX (US)

(73) Assignee: Arm Limited, Cambridge (GB)

( * ) Notice: Subject to any disclaimer, the term of this patent is extended or adjusted under 35 U.S.C. 154(b) by 635 days.

(21) Appl. No.: 17/219,721

(22) Filed: Mar. 31, 2021

(65) Prior Publication Data

US 2022/0318551 A1   Oct. 6, 2022

(51) Int. Cl.
| | |
|---|---|
| *G06V 20/80* | (2022.01) |
| *G02B 27/01* | (2006.01) |
| *G06F 3/01* | (2006.01) |
| *G06F 16/58* | (2019.01) |
| *G06F 16/587* | (2019.01) |
| *G06Q 20/32* | (2012.01) |

(52) U.S. Cl.
CPC ......... *G06V 20/80* (2022.01); *G02B 27/0172* (2013.01); *G06F 3/013* (2013.01); *G06F 16/5866* (2019.01); *G06F 16/587* (2019.01); *G06Q 20/321* (2020.05); *G06Q 20/3276* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 8,941,561 B1 | 1/2015 | Starner | |
| 10,176,636 B1 | 1/2019 | Neustein | |
| 11,062,121 B2* | 7/2021 | Croxford | G06V 10/82 |
| 11,087,562 B2* | 8/2021 | Croxford | G06F 3/165 |
| 11,508,056 B2 | 11/2022 | White | |
| 11,544,921 B1 | 1/2023 | Anvaripour et al. | |
| 2007/0172123 A1 | 7/2007 | Komatsubara et al. | |
| 2010/0271177 A1 | 10/2010 | Pang et al. | |
| 2013/0278631 A1* | 10/2013 | Border | G06F 3/04842 |
| | | | 345/633 |
| 2015/0381885 A1* | 12/2015 | Kim | G06F 3/017 |
| | | | 348/207.1 |
| 2016/0217465 A1* | 7/2016 | Gaur | G06Q 20/401 |

(Continued)

FOREIGN PATENT DOCUMENTS

| | | |
|---|---|---|
| EP | 3754969 A1 | 12/2020 |
| WO | 2013049248 A2 | 4/2013 |

OTHER PUBLICATIONS

Notification of Transmittal of the International Search Report and the Written Opinion of the International Searching Authority, or the Declaration, App. No. PCT/EP2022/025122, Mailed Jul. 6, 2022, 14 pages.

(Continued)

*Primary Examiner* — Soo Shin
(74) *Attorney, Agent, or Firm* — Berkeley Law & Technology Group, LLP

(57) ABSTRACT

Subject matter disclosed herein relates to systems, devices, and/or processes for processing signals relating to surfaces that may be viewable by subjects though one or more devices. In an embodiment, a surface may include one or more devices embedded therein to provide one or more signals to define a portion of the surface.

17 Claims, 12 Drawing Sheets

(56) References Cited

U.S. PATENT DOCUMENTS

| | | | |
|---|---|---|---|
| 2016/0267720 A1* | 9/2016 | Mandella | G06F 3/03545 |
| 2017/0160250 A1 | 6/2017 | Savoy et al. | |
| 2017/0193304 A1* | 7/2017 | Wexler | H04N 23/56 |
| 2018/0149138 A1 | 5/2018 | Thiercelin et al. | |
| 2018/0268458 A1* | 9/2018 | Popa | G06V 40/169 |
| 2019/0020843 A1 | 1/2019 | Reif | |
| 2019/0179584 A1 | 6/2019 | Masters | |
| 2020/0027275 A1* | 1/2020 | Wan | G06V 10/82 |
| 2020/0320768 A1* | 10/2020 | Salemme | A61B 5/7475 |
| 2020/0336676 A1 | 10/2020 | Lee et al. | |
| 2021/0283496 A1* | 9/2021 | Mandella | H04N 23/60 |
| 2021/0287195 A1 | 9/2021 | Prakash et al. | |
| 2021/0318558 A1* | 10/2021 | Tzvieli | G02B 27/0093 |
| 2021/0382306 A1* | 12/2021 | Croxford | G02B 27/0176 |
| 2021/0390777 A1* | 12/2021 | Lopez Mendez | G06T 7/10 |
| 2022/0019086 A1* | 1/2022 | Yao | B60K 35/28 |
| 2023/0298050 A1* | 9/2023 | Enthed | G06Q 30/0623 |
| | | | 705/7.29 |

OTHER PUBLICATIONS

Application as filed, U.S. Appl. No. 17/001,187, filed Aug. 24, 2020, 63 Pages.

Lopez-de-Ipina, "Touch Computing: Simplifying Human to Environment Interaction through NFC Technology," Las Jornadas Cientificas sobre RFID, Nov. 21-23, 2007, 12 Pages.

ZipNFC, "ZipNFC 10 X 28mm Hard PVC NFC Tag Coin Sticker NXP NTAG215 TagMo," ZipNFC 10 X 28mm Hard PVC NFC Tag Coin Sticker NXP NTAG215 TagMo : Amazon.co.uk: Electronics & Photo, Sep. 18, 2021, 6 Pages.

Application as filed, U.S. Appl. No. 17/103,744, filed Nov. 24, 2020, 106 Pages.

Office Action, U.S. Appl. No. 17/103,744, Mailed Sep. 24, 2021, 21 Pages.

Response to Office Action, U.S. Appl. No. 17/103,744, filed Dec. 22, 2021, 21 Pages.

Notification Concerning Transmittal of International Preliminary Report on Patentability (Chapter 1), App. No. PCT/EP2022/025122, Mailed Oct. 12, 2023, 8 pages.

Office Action, U.S. Appl. No. 17/219,690, Mailed Mar. 23, 2023, 47 pages.

Response to Office Action, U.S. Appl. No. 17/219,690, filed Jun. 12, 2023, 16 pages.

Final Office Action, U.S. Appl. No. 17/219,690, Mailed Aug. 17, 2023, 59 pages.

Response to Final Office Action, U.S. Appl. No. 17/219,690, filed Oct. 17, 2023, 20 pages.

Advisory Action, U.S. Appl. No. 17/219,690, Mailed Nov. 7, 2023, 30 pages.

RCE/Amendment, U.S. Appl. No. 17/219,690, filed Nov. 17, 2023, 247 pages.

Office Action, U.S. Appl. No. 17/219,707, Mailed Oct. 20, 2023, 18 pages.

* cited by examiner

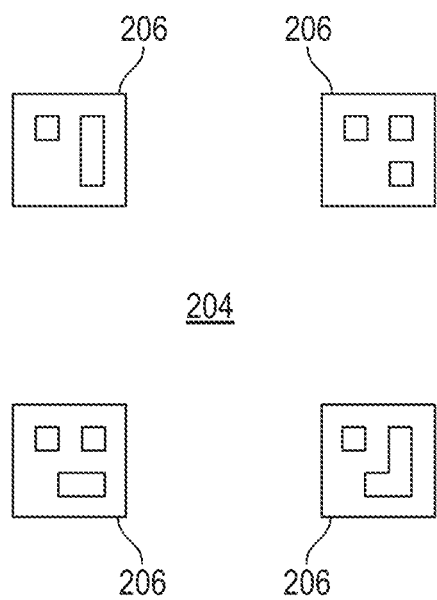
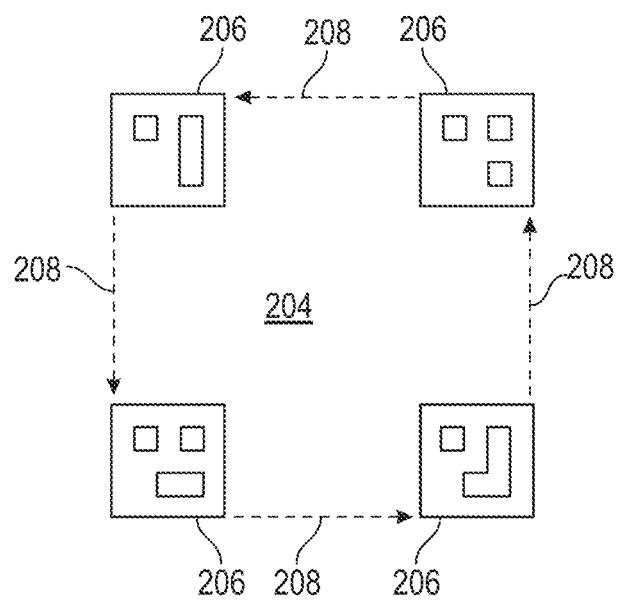
*FIG. 2A*  *FIG. 2B*

SYSTEMS, DEVICES, AND/OR PROCESSES FOR DYNAMIC SURFACE MARKING

CROSS REFERENCE TO RELATED APPLICATIONS

This application is related to U.S. patent application Ser. No. 17/219,690, titled "SYSTEMS, DEVICES, AND/OR PROCESSES FOR DYNAMIC SURFACE MARKING," filed on Mar. 31, 2021, and incorporated herein by reference in its entirety, and is related to U.S. patent application Ser. No. 17/219,707, titled "SYSTEMS, DEVICES, AND/OR PROCESSES FOR DYNAMIC SURFACE MARKING," filed on Mar. 31, 2021, and incorporated herein by reference in its entirety.

BACKGROUND

Field

Subject matter disclosed herein may relate to systems, devices, and/or processes for capturing images of marked surfaces.

Information

Mobile computing devices may comprise advanced display devices and cameras to capture still and/or video images. Such mobile computing devices may comprise mobile phones or wearable devices such as smart watches and smart glasses. In a particular implementation, smart glasses may provide to a wearer an augmented reality experience by superimposing sights, sounds, orders, etc. onto an environment experienced by the wearer.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 2A and 2B is a schematic diagram of devices embedded in a marked surface according to an embodiment;

Figure 1:
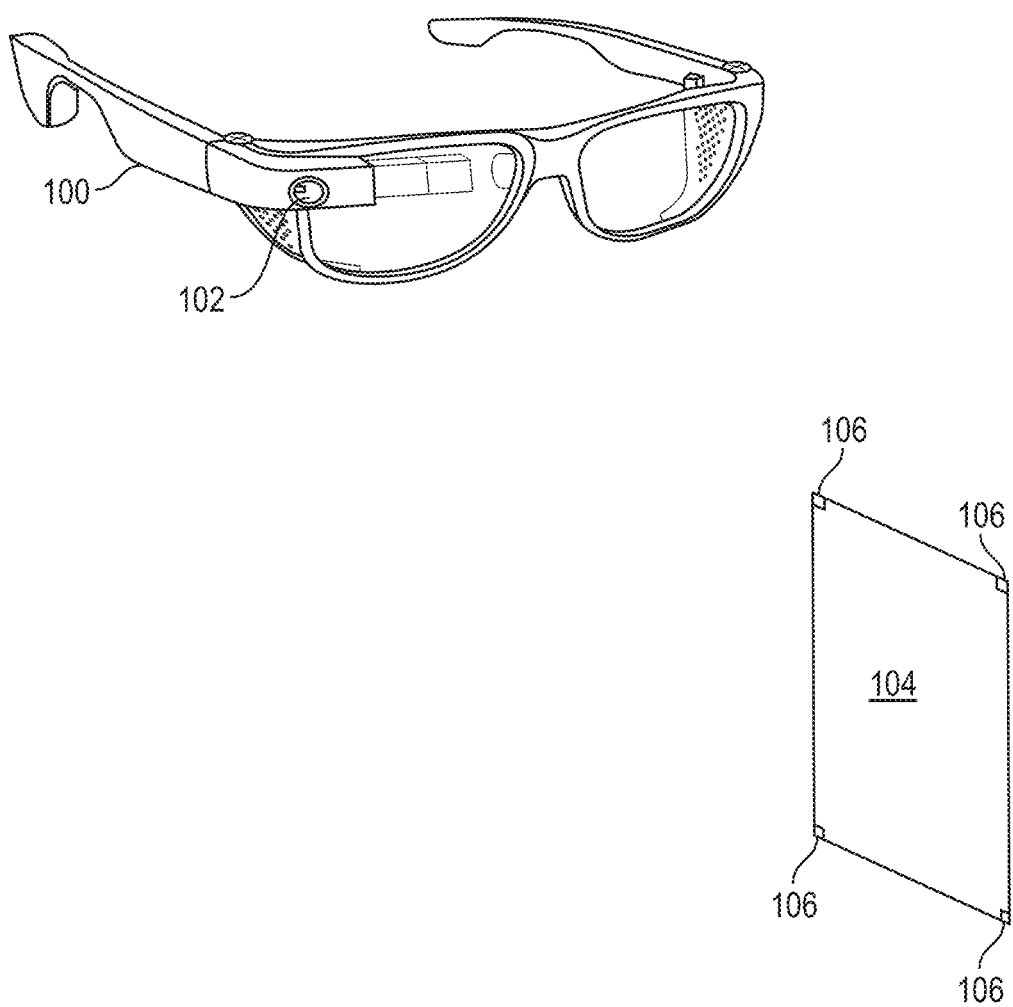
FIG. 1 is a schematic diagram of a system to capture images of a marked surface, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

Integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of diverse content may prove to be relatively resource-demanding, which may present a number of challenges including, for example, increased processing latencies, storage demands, complexity, cost, and/or the like.

The terms "operator and/or "user" refers to human individuals, and/or may be utilized herein interchangeably. In an embodiment, an operator and/or user may operate a machine, although subject matter is not limited in scope in these respects. Further, as utilized herein, "machine" refers to an article of manufacture, such as, for example, a mechanically, electrically, and/or electronically operated device for performing a task. In some embodiments, operation of a machine may be performed by a combination of an operator and/or a computing device, and/or operation of a machine may be based at least in part on a behavioral profile of at least one particular operator, as explained more fully herein.

As discussed above, a wearable computing device may comprise a camera that is capable of capturing still and/or video images while being worn by a human user. For example, a pair of smart glasses worn by a user (e.g., "wearer") may comprise a camera to capture images of objects and/or surfaces in the user's line of sight. Here, a user may initiate such image capture by, for example, touching/tapping a portion of the worn glasses, providing a spoken cue and/or providing an input to another device (e.g., input to another mobile computing device maintaining a wireless communication link to the worn glasses), just to provide a few examples. Unfortunately, requiring a user to actively initiate capture images from a worn device may result in missed opportunities to capture such images that are of value to a wearer of the worn device.

According to an embodiment, a surface may have disposed therein/thereon one or more surface markers to provide one or more signals that are detectable by a mobile worn device. Such signals provided by the one or more surface markers may define an area of a surface that is to be automatically image captured by the mobile worn device. Responsive, at least in part, to receipt of the one or more signals provided by the one or more surface markers, the mobile worn device may automatically capture an image of a portion the surface specified by the one or more signals. Such automatic capture of an image of the portion of the surface may alleviate or eliminate a requirement of a wearer of the mobile worn device to actively initiate image capture.

FIG. 1 is a schematic diagram of a system to capture images of a surface, according to an embodiment. A pair of smart glasses 100 may comprise a camera 102 that is capable of capturing images in a line of sight of a wearer while smart glasses 100 rest on the wearer's face. Smart glasses 100 may also comprise one or more computing devices, memories, sensors, batteries, energy collection devices and/or communication devices (not shown). In an embodiment, camera 102 may capture images of surfaces in a wearer's line of sight as signals associated with pixel locations to be stored in a memory device in any one of several available encoding and/or compression formats. In a particular implementation, such a captured image may comprise signals that may have been translated to a set of pixels representing a subset of a wearer's line of sight. Determination of such a subset of a wearer's line of sight may occur prior to an encoding, compression and/or storage of pixel values in a memory.

Surface 104 may comprise visible features of interest that may be included in an image captured by camera 102. Surface marker 106 disposed on and/or in marked surface 104 may provide one or more signals which are detectable by one or more devices of pair of smart glasses 100. Such a signal provided by surface markers 106 may comprise one or more visual codes/symbols, an audible or inaudible acoustic signal, visible or non-visible encoded light or radio frequency signal, just to provide a few examples. In this context, a "marked surface" as referred to herein means a surface (e.g., planar or non-planar surface) providing visual features and/or content and, includes at least one surface marker disposed therein and/or thereon to provide signals indicating one aspect of how the visual content is to be processed.

According to an embodiment, a surface marker (e.g., surface marker 106, 206 or 306) may be disposed on and/or in a periphery of an associated surface in any one of multiple forms. In one embodiment, a surface marker may comprise an embedded device including, for example, an emitter capable of transmitting signal energy (e.g., light, acoustic and/or radio frequency signal energy modulated with information to be received by an image capture device). Alternatively, a surface marker may comprise paint, an adhesive-backed sticker and/or other material that may be placed on a periphery of an associated surface. Here, such a surface marker may passively provide one or more signals by, for example, reflecting light energy (e.g., providing a visual signal) and/or radio frequency energy, just to provide a couple of examples. A surface marker may also take an intangible form such as a portion of an image that is dynamically displayed (e.g., as embedded in visual content that changes over time). In an embodiment, signals provided by a marked surface may change to implement changes in how content is to be processed.

According to an embodiment, signals provided by surface markers 106 may provide a "visual cue" indicating an instruction to take some action. For example, such a visual cue may, in effect, act as a visual "hotword" to enable one or more aspects of an automated process. In a particular implementation, such signals provided by surface markers 106 may prompt camera 102 to act in some manner such as to capture a still and/or video image of at least a portion of surface 104, and/or process such a captured image.

FIGS. 2A and 2B are directed to an example implementation of surface markers 206 disposed on and/or in a surface 204. Here, surface markers 206 may express a signature that may be visually detected and/or interpreted at a computing device based, at least in part, on images of such markers captured by an imaging device (e.g., camera 102). Such a signature expressed by a surface marker 206 may indicate, for example, a unique identifier, a location of the particular surface marker 206 (e.g., with respect to marked surface 204, one or more other surface markers 206 and/or some other location reference), or any one of several other types of useful information and/or metadata. In particular implementations, signals provided by surface markers 206 to a device (e.g., smart glasses 100) may include a unique identifier associated with marked surface 204 (e.g., enabling unique identification of marked surface 204) and provide an instruction as to how the device is to capture a full field of view into a limited subset of pixels including an image of marked surface 204. Signals provided by surface markers 206 may also include location identifiers, surface type identifier, just to provide a few examples of type of information and/or metadata that may be provided by signals provided to a device by surface markers. Such signatures expressed by surface markers 206 may, individually or collectively, indicate one or more instructions such as, for example, an instruction to capture an image of marked surface 204 image and/or crop such a captured image of marked surface 204. For example, signatures expressed by one or more other surface markers 206 may signal to a computing device (not shown) at smart glasses 100 to capture snapshot and/or video of image of marked surface 204. Here, such a signal to a computing device may initiate automatic capture of a snapshot and/or video of visual content presented on marked surface without any additional action taken to a wearer of smart classes 100.

Figure 3:
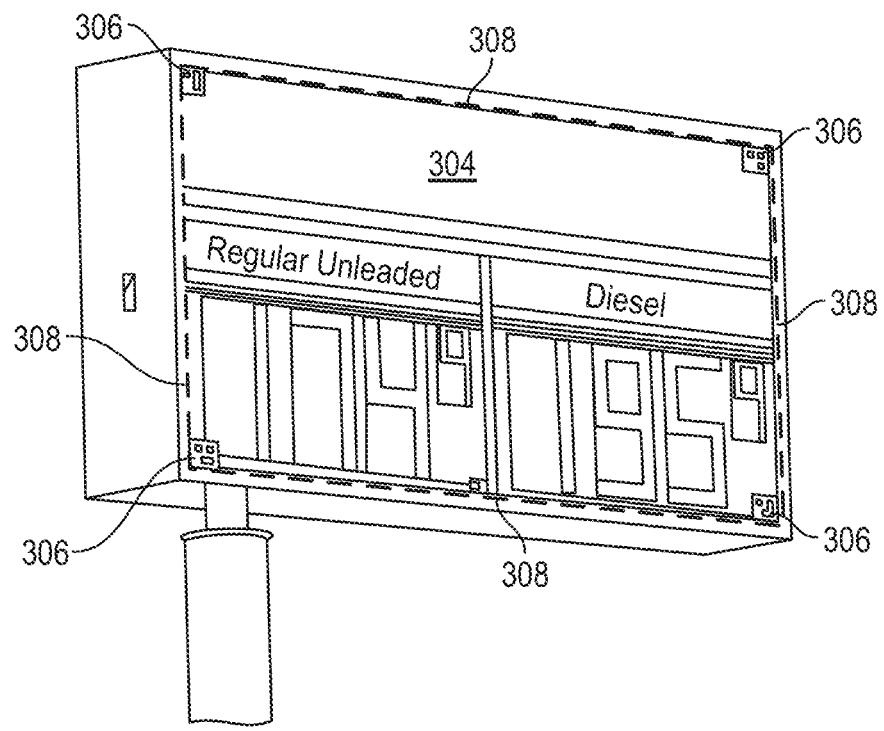
FIG. 3 is a schematic diagram of a marked surface having devices embedded therein.

Signatures expressed by one or more surface markers 206 may also signal to such a computing device of smart glasses 100 parameters defining a particular portion of an image of marked surface 204 to be cropped. For example, such signals may be indicate cropping instructions shown as vectors 208 that define a boundary of a resulting cropped image to be captured in a memory of a computing device. As an imaging device may have an effective field of view that extends beyond boundaries of marked surface 204, such cropping may limit the captured image to visual content presented within the boundary of marked surface 204, and remove any portion outside of that boundary, In an implementation, a computing device of smart glasses 100 may comprise pattern recognition capabilities to detect/decode visual signals provided by surface markers. FIG. 3 shows a particular example, embodiment in which a gas station sign 304 may have disposed thereon and/or therein surface markers 306 to provide a visual signal and/or signature indicated a capture of an image of gas station sign 304 to be cropped along a boundary 308.

According to an embodiment, smart glasses 100 may implement a machine-language (ML) based rejection filter to prevent and/or inhibit capture (e.g., in memory or other recording media) any features of a human and/or human faces, enabling an enhanced level of private and/or security. For example, prior to storage of pixel values of an image in a memory device, an embedded machine-learning filter may detect portions of the image that correspond to features of a live human. Responsive to such detection of features of a live human, the machine-learning filter may reject and/or prevent capture prior to storage of pixel values in a memory device to represent a captured image.

For example, prior to storage of pixel values in a memory (as part of an image capture), an embedded (e.g., in hardware and/or software) machine-learning filter may detect portions of the image including features of a live human. This may address societal concerns in connection with personal privacy. With such a "human detection" feature images that contain features of live people/humans may be avoided.

In one particular implementation, an ML based human-detection and rejection filter as discussed above may employ a neural network that is trained to detect whether or not an image contains features of a human (this may be done with a set of labeled training data, for example). In an embodiment, such an ML model may be executed by a neural network processing unit (NPU) integrated with image capture hardware (e.g., NPU integrated with smart glasses 100). Portions of a candidate image may be filtered through an ML rejection filter where the candidate image may act as an input to a trained ML model. If the trained ML model is capable of detecting features of a live human in a candidate image to be captured, such a trained ML model may prevent and/or inhibit storage of pixel values to represent the candidate image in a memory device. On the other hand, if the ML model output predicts that the candidate image does not contain features of a live human (e.g., the candidate image "passes" the ML-based rejection filter), pixel values of the candidate image may be stored to a system memory to be accessible by a user or some other application. In an embodiment, an ML based rejection filter may be implemented at a hardware level (e.g., in an application specific circuit integrated with smart glasses 100) that is not accessible by a software stack. This may prevent the ML-based rejection filter from being tampered with and/or disabled.

Utility of the aforementioned ML-based rejection filter is not limited to use with capturing images of marked surfaces by an image capture device integrated with smart glasses. Another application may include image capture for multi-national satellites where there is a desire to impede and/or prevent capture of an image containing certain types of features as pixel values stored in a memory, for example. Here, a multi-national satellite may be prevented from capturing images, for example, responsive to a ground-based visual cue.

According to an embodiment, a ML-based rejection filter (e.g., to detect features of a live human and reject capture of images containing such detected features) may be continuously active. For example, smart glasses 100 may automatically detect a presence of a human in view of camera 102, and automatically reject and/or impede capture (e.g., storage in memory) of any image containing features of a live human in view of camera 102. Nonetheless, surface markers 106 and/or 206 may provide signals as to which ML rejection filter and/or which ML rejection parameters are to be applied by smart glasses 100. For example, signals from surface markers a surface capture device (e.g., smart glasses 100) may employ an ML implementation of a human detect and reject filter.

In the particular example embodiments shown in FIGS. 2A, 2B and 3, surface markers 206 and 306 disposed in and/or on a marked surface may provide signals as a visual indicator to be captured in an image at a camera (e.g., camera 102), and further processed to provide instructions to automatically capture an image of the marked surface and/or instructions to crop the automatically captured image. In other implementations, an image capture device (such as smart glasses 100) may comprise sensors and/or devices capable of receiving and/or processing signals other than visual indicators such as, for example, microphones/acoustical transducers, photodiodes and/or radio frequency (RF) receivers. According to an embodiment, surface markers disposed in and/or on a marked surface may provide such signals with image capture and/or cropping instructions as encoded RF signals, encoded infrared signals and/or acoustical/audible signals that are interpretable at a receiving image capture device. It should be understood that signals provided by a surface marker need not be visible or audibly by a human. As such, a wearer of an image capture device may be completely unaware of signals provided by a marked surface. In one particular example, an image capture device may employ active or passive sensing to receive signals provided by surface markers. For example, surface markers disposed in and/or on a marked surface (e.g., surface markers 106, 206 or 306) may comprise surface markers capable of modulating a reflected signal transmitted from the image capture device with instructions to capture and/or crop an image in an active sensing arrangement.

Figure 4A:
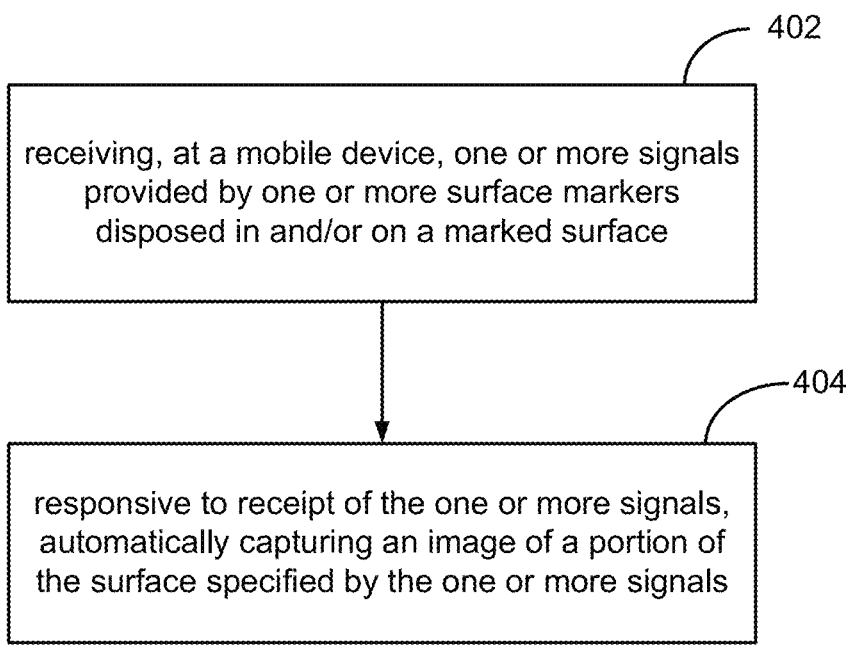
FIG. 4A is a flow diagram of a process for automatic capture of an image of a surface marked according to an embodiment.

FIG. 4A is a flow diagram of a process 400 for automatic capture of an image of visual content presented in a marked surface according to an embodiment. In a particular implementation, process 400 may be executed, at least in part, by a computing device such as a computing device embedded in smart glasses 100, for example. Block 402 may comprise receipt of one or more signals provided by one or more surface markers disposed in and/or on a surface such as surface markers 206 disposed in and/or on surface 204 or surface markers 306 disposed in and/or on surface 304. Such signals received at block 402 may comprise one or more visual indicators, RF signals, light signals and/or acoustical signals, for example. As pointed out above, such RF signals, light signals and/or acoustic signals may have been reflected from devices embedded in surface 204 in an active sensing arrangement. Responsive at least in part to signals received at block 402, block 404 may automatically capture an image of a portion of a surface specified by signals received at block 402. As discussed above, block 404 may comprise an automatic capture of a still or video image at an image capture device (e.g., camera 102 of smart glasses 100) and/or cropping of such an automatically captured image according to cropping instructions (e.g., to remove portions of an outside a boundary of marked surface presenting visual content of interest) provided in signals received at block 402. Also, block 404 may include application of a machine learning rejection filter to, for example, prohibit and/or inhibit capture of an image containing any features of a live human (e.g., using a machine learning filter and prior to storage of pixel values in a memory device to complete image capture).

According to an embodiment, process 400 may be implemented in an application in which visual content of a marked surface may be expected to change frequently, such as in a live instructional environment/application in which devices may be embedded in a "dynamic blackboard/whiteboard." In one implementation, electrically powered (e.g., battery powered) surface marker devices may be affixed to a locations of a blackboard/whiteboard. In an alternative implementation, an electronic screen display (e.g., LED/LCD display) where surface markers are laid over/interleaved with displayed video content. In an example application, an instructor may remotely change signals provided by a surface marker (e.g., using a "clicker" and/or mobile computing device) to, for example, cue image capture devices to capture one or more images of visual content being presented. In one particular implementation, an instructor may similarly change surface markers disposed on and/or in the marked surface (e.g., change a visible code such as on surface markers 206 or 306) to thereby change signals to be received at a single image capture device placed within a classroom and/or at devices worn by students (e.g., smart glasses such as smart glasses 100). Such changed signals provided by surface markers may synchronize with changes in visual content presented on a marked surface, and may cue a single image capture device placed within a classroom and/or devices worn by students to capture still and/or video images of content presented on the marked surface.

Images of a marked surface captured at a single image capture device placed within a classroom and/or devices worn by students may provide a history of content to serve as study/review material for students/live attendees or as inputs to other processes/applications. In one particular embodiment, a marked surface and/or visual content presented on a marked surface may be associated with one or more unique surface identifiers (IDs). Such unique surface IDs may be expressed, for example, in detectable signals provided by surface markers disposed on and/or in a marked surface and/or content presented on the marked surface. In an implementation, unique surface IDs marked surface and/or content presented on a marked surface may be logically mapped to captured surface images to provide a framework organizing captured surface images as review and/or study materials. For example, such unique surface IDs may be used to create links that are selectable in a graphical user interface (GUI) to retrieve particular associated captured images of marked surface(s).

As pointed out above, such an instructor may, at appropriate/logical times, remotely command surface markers disposed on and/or in a marked surface to change signals provided to devices worn by students via the surface markers (e.g., using a clicker). Such appropriate/logical times may occur at appropriate transition points such as prior to "erasing" of content, between lessons or topics, or at intermediate steps of a process such as in solving an equation in mathematics.

According to an embodiment, dynamically changing signals provided by surface markers disposed on and/or in a marked surface may enable production of an intelligent, compressed capture of video images with an acceptable loss of information. For example, a video image of changing visual content on a marked surface may be compressed to only show visual content immediately preceding and/or following a change in signals provided by surface markers disposed in and/or on the marked surface (e.g., ten seconds before and/or ten seconds after such a change in signals). In the case of an instructor controlled marked surface, for example, an instructor may provide hints via changing signals provided by surface markers that would allow for the compression of otherwise long educational videos into a compact lesson ready for review. In a particular implementation, a skilled instructor may choose instances to change signals provided by surface markers so as to influence how an image-captured version of their lecture content is to be compressed (e.g., according to desired specifications), providing a version of the lecture content to the instructor's desired specifications. An instructor may also control an audio component of lecture content to be synchronized with signals provided by surface markers initiating placement of key points into a compressed version the lecture content. Such an option may exist later to strip original audio and enable voice over for compressed video to improve coherence/suitability for a final purpose.

Figure 4B:
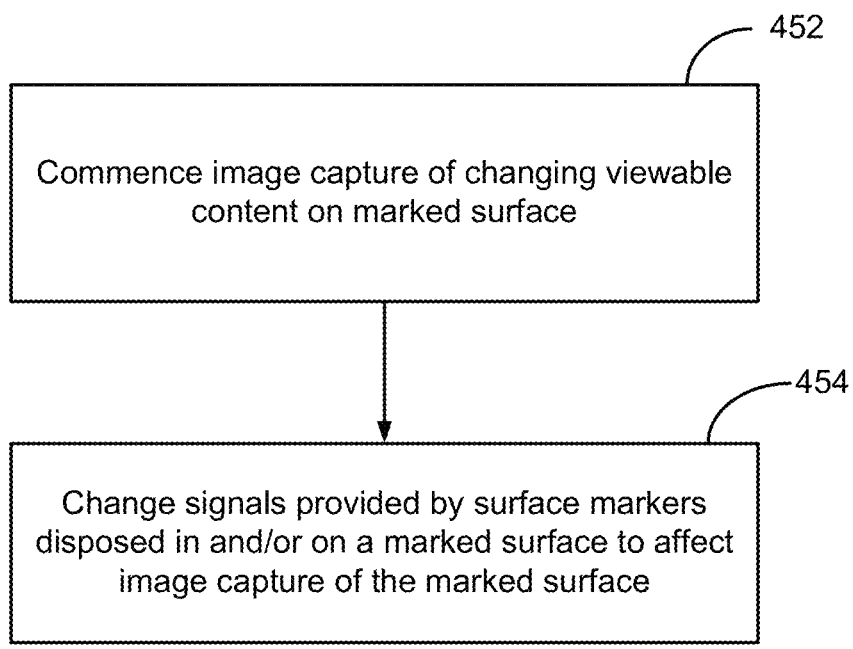
FIG. 4B is a flow diagram of a process in which capture of an image of a marked surface may be affected by dynamic change in signals provided by one or more devices embedded in the marked surface, according to an embodiment.

FIG. 4B is a flow diagram of a process 450 in which image capture of visual content presented on a marked surface may be affected by dynamic changes in signals provided by surface markers disposed in and/or on the marked surface. Block 452 may comprise commencement of image capture of visual content on a marked surface that is changing over time. For example, an instructor may affect signals provided by surface markers disposed on and/or in the marked surface to initiate image capture at devices worn by students. Block 454 may change signals provided by surface markers disposed on and/or in a marked surface to affect changes in an image capture process to occur at worn devices. In one embodiment, changes in signals provided by surface markers at block 454 may be controlled and/or initiated by an instructor, as described above. Alternatively, changes in signals provided by surface markers at block 454 may be controlled and/or initiated by a machine learning process capable of identifying moments of a logical (e.g., thematic) transition in presented visual content. Such identified moments of a logical transition in presented visual content may signify corresponding changes in a capture mode, for example. Such changes in signals provided by surface markers may determine anchor points enabling full-length video navigation, for example.

Additionally, block 454 may initiate automated actions (e.g., automated actions determined by a machine learning process) to improve coherence/viewing quality in captured image content according to such as initiating content cuts varying in alignment according to a speaker's sentence breaks or silent pauses. In an implementation, such automated actions may provide a change point in captured video content to act as inserted "skip ahead" markers for video navigation (e.g., selectable by "next" and "back" buttons/features) that enable convenient navigation. For example, such inserted markers may enable a student to use a "go back" button/feature (e.g., to a last understood state) if the student learning new material. Additionally, such use of a "go back" button/feature to return to a last understood state of captured content may facilitate efficient navigation to points of deviation from understanding for greatest learning efficiency.

Furthermore, efficiencies may be achieved for an application in which replayed captured content is to be streamed through high cost bandwidth (e.g., in the developing world). For example, compression of a video capture of viewable content of a marked surface may enable creation of preview segments for a video preview, "trailer" and/or "thumbnail," for example. Such a preview, trailer and/or thumbnail may comprise automatically-created and/or compressed video to enable a user in determining whether to download an entire video capture. In another embodiment, portions of a captured video presentation may be compressed into one or more still images presented as a slide deck and/or in another click-through format, for example. A machine learning and/or speech-to-text analysis may then be used to generate a transcript from captured video to correspond with spoken portions of audio component synchronized with change points (e.g., change points inserted responsive to changes in signals provided by devices embedded in a marked surface). In an embodiment, a marked surface may have enabled creation of versions of captured visual content that evolve through revisions of such captured visual content presented on the marked surface, for example. In an implementation, surface markers disposed on and/or in a marked surface may provide signals indicating, among other things, indications of a unique identifier and/or a version. This may enable creation of compressed, consolidated captured video across video files across multiple versions by extracting common elements (e.g., main images in a presentation to do not changes across multiple versions). This may enable an option of aggregating video previews, trailers and/or thumbnails into a single, compressed video presentation that spans an entirety of a course being taught, beyond just a single lecture. In one particular example implementation, information provided by surface markers may enable converting a single video of a 1.5 hour lecture to a 45 second presentation (e.g., slide show) of a progression of images presented on a surface during the lecture. Here, each slide in the second presentation may represent a particular image presented on a marked surface and marked accordingly (e.g., based on signals provided by surface markers disposed in and/or on a marked surface). In another particular example, information provided by signals of surface markers may enable converting video presentations for multiple lectures of an entire course (e.g., spanning six months) to a single one hour video presentation. Here, surface markers may flag and/or indicate which portions in a lecture are to be included in or excluded from the single one hour video presentation. In yet another particular example, information provided by signals of surface markers may enable creation of "best-of" by culling segments of multiple versions of the course presented by different instructors (e.g., in different classrooms/lecture halls).

In particular scenarios, physical surroundings may be heavily populated with intentionally-communicated visual image content. For example, a business may post signs or specials (e.g., menu specials for a restaurant) outside of its business establishment(s), bulletin boards may post flyers, cases and/or windows may display items, etc. According to an embodiment, such intentionally-communicated visual content may be presented on a marked surface as described above in which surface markers are disposed therein/thereon/therewith (e.g., surface markers 106 or 206) to provide signals to worn devices for capturing images of portions of the marked surface. In particular implementations, marked surfaces having intentionally-communicated visual image content may be optimized/placed to be seen by a human passerby. As such, use of a worn image capture device (e.g., integrated with smart glasses 100) may enable automatic image capture at a human eye level.

According to an embodiment, features of a process may provide an in-demand convenience that enables remote view of a marked surface. As pointed out above, a marked surface may be defined, at least in part, by surface markers disposed therein/thereon that provide signals to affect processing of an image to be captured by a worn device. Examples of marked surfaces that may be remotely viewed may include, for example, a bulletin board, a specials board at a restaurant, a theater marquee, a portion of a shop window, a retail or grocery display case, or any other physical surface that may be designated a marked surface by surface markers disposed on and/or in the physical marked surface. As pointed out above in a particular implementation, signals provided by surface markers may communicate commands such as cues to image capture hardware to initiate actions such as automatic image capture of visual content and/or boundary-based cropping and/or rejection filters (e.g., in combination with human detection and/or rejection filters employing machine learning to inhibit and/or prevent storage of pixel values of an image containing features of a live human in a memory).

In a particular implementation, a remote surface image capture marketplace may be implemented, at least in part, on multiple computing devices (associated with different parties) that communicate in a communication network. According to an embodiment, transactions may be facilitated for electronically for delivery of captured images of marked surfaces for remote viewing. Buyer and seller participation may enable viewing of remote images to enable a convenience to parties that are unable to view marked surfaces in person. Buyers that are interested in remotely viewing a marked surface may communicate a request for a selected marked surface while sellers interested in providing a captured image of a remote marked surface benefit from a capability of automatically capturing such an image of a marked surface, sharing the captured image with participants in a marketplace, and possibly receiving (micro) compensation if open orders are fulfilled by delivery of the captured image. Features of an implementation may enable seamless participation of parties in a marketplace for marked surfaces by incorporating image capture hardware into an image capture device worn by a selling party (e.g., smart glasses as described above).

Figure 5:
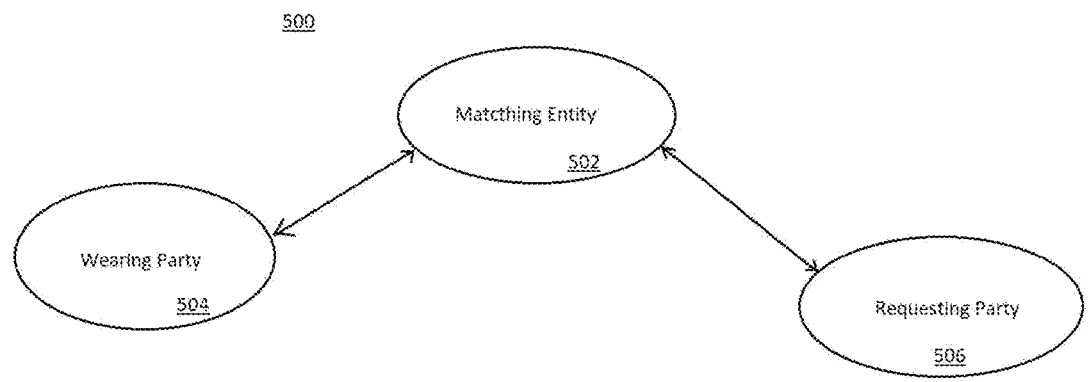
FIG. 5 is a schematic diagram in which a first party may request that a second party capture an image of a marked surface, according to an embodiment.

FIG. 5 is a schematic diagram in which a first party may request that a second party capture, deliver and/or share an image of a marked surface, according to an embodiment. According to an embodiment, a matching entity 502, wearing party 504 and requesting party 506 may be associated with respective computing devices that are capable of communicating in a communication network, for example. Marked surfaces (presenting visual content that may be captured) may include, for example, commercial signage, theatre marquees, grocery and/or retail display case, restaurant specials board, just to provide a few examples. Requesting party 506 may be physically separated from the environment and/or may be otherwise incapable of viewing marked surfaces in the particular environment. Nonetheless, requesting party 506 may value viewing of images of visual content in the particular environment which are viewable by wearing party 504. Additionally, for some value in exchange, wearing party 504 may be willing to obtain captured images of such visual content in the particular environment, and transfer/transmit and/or facilitate transfer/transmission of such captured images to requesting party 506.

In an embodiment, wearing party 504 may comprise a "selling party" interested in capturing, sharing and/or delivering an image of a marked surface for sale while requesting party 506 may comprise a "buying party." In a particular implementation, wearing party 504 may be associated with a wearable device (e.g., smart glasses 100 or smart watch) that is capable of capturing images. Likewise, requesting party 506 may be associated with a client device such as, for example, a mobile computing device (e.g., with a display for presentation of captured and delivered images). Also, matching entity 502 may be associated with a computing device to act as a server capable of communicating with computing devices associated with wearing party 504 and requesting party 506 over a communication network. For example, matching entity 502 may process "orders" by requesting party 506 for delivery of captured images by wearing party 504 to fill such orders (e.g., in exchange for a predefined compensation). In a particular implementation, matching entity 502 may facilitate communication of commitments by requesting party 506 to compensate a wearing party 504 (e.g., as a bounty) for obtaining/delivering a captured surface image of visual content requested by the requesting party 506.

According to an embodiment, requesting party 506, through matching party 502, may create orders to establish requirements for a desired captured image of visual content presented by a marked surface, and compensation to be provided to a wearing party 504 for delivery of the desired captured image. Here, a process for capturing, delivering and/or sharing desired image may be automated subject to and/or bounded by rules established by wearing party 504 (e.g., desired minimum threshold compensation, privacy by restricting locations from which an image may be captured, maintaining a minimum battery level). In an example, wearing party 504 may capture images of marked surfaces as wearing party 504 travels throughout the day, and may optionally share/deliver such captured images of marked surfaces subject to a set of rules regarding sharing those captured images to any requesting party 506 as part of a remote surface image capture marketplace, for example. In an embodiment, matching party 502 may post or otherwise communicate an order comprising commitment by requesting party 506 to compensate a wearing party 504 for delivery of a desired capture image of a marked surface. In a particular illustrative example, a requesting party 506 may desire to know particular soup specials shown on a marked display of a restaurant, and therefore may generate an order with a commitment to compensate a wearing party 504 for delivery of an image of the marked display. Capture of an image of visual content presented by the marked display by wearing party 504 within the past hour may satisfy such a request. In this case, wearing party 504 may, subject to a set of predefined rules, agree to share and/or deliver the recently captured image even though wearing party 504 obtained the captured image prior to learning of the commitment from requesting party 506. Thus, no additional explicit action may be required of wearing party 504 to complete the transaction.

In an alternative implementation, requesting party 506, through matching party 502, may create and order to establish a bounty for obtaining a desired capture of an image of a marked to, for example, influence a wearing party 504 to take action to obtain and deliver such an image. For example, induced by such a bounty, a wearing party 504 may navigate to a location of a desired marked surface with the purpose of capturing an image of the desired marked surface for delivery of the captured image for filling an order (and also possibly receiving the bounty). In this particular case, a requested captured image of visual content presented by a marked surface may not exist in advance of the bounty established by the requesting party 506 in an order. In an embodiment, a requesting party 506, through matching party 502, may provide an order committing to payment of a bounty to multiple wearing parties 504 and the bounty is awarded to the first wearing party 504 that delivers a captured image as specified in the order.

In an embodiment, wearing party 504 wearing a device may travel in a particular environment in which objects (e.g., marked surfaces) may be viewable (such as through smart glasses including an image capture device). For simplicity, embodiments described in process 600 have employed an image capture device implemented in pair of smart glasses (e.g., smart glasses 100). It should be understood, however, that different types of devices may be used. While particular implementations may include delivery of captured image content from wearing party 504 to requesting party 506, as well as batch transfer of captured image content (e.g., when smart glasses are placed in a WiFi-enabled charging case, or connected via a Bluetooth link to a device with network connectivity to matching entity 502 and/or requesting party 506).

While a smartphone may be used by wearing party 504 as an image capture device, such a smartphone may be of limited use for capturing images of a marked surface. For example, use of smartphone for image capture may entail removal of the smartphone from a purse or pocket, holding the smartphone at eye-level and selecting a button. Implementing an image capture function in smart glasses to be worn at eye level, however, may provide improved alignment with a primary function of smart glasses. Automatic image capture by a device worn at eye-level may further improve upon use of a smartphone-based solution (which may require deliberate action by a user to capture an image). Use of image capture devices in smart glasses may allow a wearing party 504 to easily/seamlessly/automatically/and in the background capture images of marked surfaces as the wearing party 504 moves naturally throughout the day (e.g., without deliberately removing the smartphone from a pocket to capture an image of a specific marked surface as wearing party 504 becomes aware of the marked surface). As such, smart glasses with aforementioned image capture capabilities may enable capture of images of an increased number of marked surfaces (and possibly greater income) for a wearing party 504 with less time, effort and/or attention.

According to an embodiment, requesting party 506 may forward one or more request messages to matching entity 502 comprising orders identifying specific marked surfaces of which images may be desired by requesting party to be captured and/or delivered. Such a request message may specify, for example, one or more orders comprising parameters identifying a marked surface (of which a captured image is desired) and an amount of value (e.g., in USD and/or fractions thereof) that requesting party 506 may be willing to pay. Such parameters identifying a marked surface may specify, for example, a location (e.g., in GPS coordinates), unique identifier associated with marked surface, valid time duration/window in which the image is to be captured, whether the captured image is to be a snapshot or video image, just to provide few examples.

According to an embodiment, wearing party 504 may deliver to requesting party 506 matching entity 502 (e.g., directly or through matching party 502) a captured image to fulfil an order automatically and subject to rules/conditions established by wearing party 504. In one alternative implementation, matching entity 502 may indicate to wearing party 504 that delivery of a captured image of a marked surface image is desired by a requesting party 506, and communicate to wearing party 504 an order specifying requirements and/or compensation for delivery of such a captured image. Such an order may be communicated by matching entity 502 in one or more messages transmitted to wearing party 504. As pointed out above, an image capture device worn by a wearing party 504 may establish rules, conditions and/or requirements applied in background processing based on an automated rule set (e.g., rules for sharing under certain conditions as set by wearing party 504 that may include variables such as threshold minimum compensation, privacy or device battery life etc.). An automatic surface capture process as may occur as wearing party 504 moves throughout the world and the matching party 502 manages delivery of any captured surface images (matching to an order from a requesting party 506). In an embodiment, matching entity 502 may forward one or more messages to wearing party 504 indicting marked surfaces of which captured images are desired by one or more requesting parties 506. In one embodiment, multiple wearing parties 504 may receive a message from matching party 502 comprising an order indicating a bounty opportunity (e.g., for the first wearing party 504 that is to capture a specified image). Such an order in a message may be provided in background processing, and define as set of requirements and/or rules associated with capturing a specified image (e.g., unique ID associated with marked surface, time or range of time which the image is to be captured, image quality). For bounties that are high (e.g., from a highly motivated requesting party 506), wearing parties 504 may be interrupted to be alerted of the opportunity to capture a marked surface image. Pre-set rules, however, may affect this (e.g., if a battery level of capture device is below a certain threshold, capture device in a battery saving mode and/or privacy concerns of wearing party 504, etc.)

In an alternative embodiment (e.g., during conditions defined by rules such as battery life is below a certain level on a capture device worn by a wearing party 504), a computing platform associated with wearing party 504 may select (e.g., responsive to a selection at a graphical user interface (GUI) at the computing platform associated with the wearing party 504) to deliver a captured image that is requested. Alternatively, wearing party 504 may forward one or more messages to matching part 502 indicating potential objects (e.g., marked surfaces) of which wearing party may capture and an expected/desired compensation offered to capture images. Here, a computing platform associated with requesting party 506 may select (e.g., responsive to selection at a GUI at the computing device associated with the requesting party 506).

In an embodiment, matching entity 502 may track a location of wearing party 504 (e.g., by location services enabled for a mobile device co-located with wearing party 504 provided by a service carrier) to determine requests from requesting party 506 that are to be associated with a current location of matching entity 502. In alternative implementations, locations of wearing party 504 may be concealed and/or maintained in privacy. Nonetheless, for a use case of delivery/share of a captured marked surface image, the captured marked surface image may include location parameters (e.g., indicative of a location of a wearing party 504 in the past at the time instance at which the marked surface image was captured). Here, matching entity 502 may determine that a delivered image of a particular marked surface (e.g., associated with a unique identifier which has been registered with accompanying metadata including location parameters) is valid (e.g., not fraudulent) based, at least in part on location parameters in metadata associated with the delivered image. For example, matching entity 502 may determine/confirm that a wearing party 504 was actually physically co-located with particular marked surface at time of capture.

According to an embodiment, a computing device associated with wearing party 504 may display to wearing party 504 outstanding orders (e.g., from requesting party 506) for capture of an image of a marked surface in proximity to a current location of wearing party 504 along with compensation commitments for obtaining associated captured images of the marked surface. Wearing party 504 may then agree to obtain a captured image for the offered compensation by selecting to obtain the captured image for the offered compensation (e.g., transmission of an "acceptance" message initiated by selection at a GUI).

In an alternative implementation, without an explicit agreement to deliver a captured image, wearing party 504 may navigate to a location of an indicated marked surface (e.g., intentionally to capture a surface image or for other purposes) where a device worn by wearing party 504 may automatically capture an image of the indicated marked surface (e.g., responsive to signals received from one or more surface markers disposed on and/or in the indicated marked surface). In another example implementation, multiple wearing parties 504 may be directed to a particular opportunity for offered compensation (e.g., bounty) for capturing an image of the marked surface. Here, only one wearing party 504 may fulfill an associated request for capturing the image the offered compensation. In particular implementations, matching party 502 and/or requesting party 506 may establish floating orders (e.g., "asks") may be automatically filled by one or more wearing parties 504 according to pre-set sharing rules (e.g., established by one or more wearing parties 504 as discussed above).

According to an embodiment, a marked surface identified in an order provided in a request message from a requesting party 506 may comprise a marked surface having surface markers disposed therein/thereon (such as surface markers 206 or 306) to provide signals to a device worn by wearing party 504 to automatically capture an image of at least a portion of the marked surface as specified by the signals provided by the surface markers. Here, responsive to receipt of such signals, a device worn by wearing party 504 (e.g., smart classes 100) may automatically capture the image of the marked surface.

According to particular embodiments, an image capture device worn by wearing party 504 may include any one of several features of image capture devices such as an image capture device of smart glasses 100 discussed above. For example, a device worn by wearing party 504 implementing capture of images may respond to signals provided by surface markers as instructions to automatically detect/capture an image and/or crop portions. Such a worn device may also employ a machine learning-based rejection filter to reject/prevent/inhibit storage of pixel values of in image containing portions of an human as discussed above. Also, such an image capture device worn by wearing party 504 may comprise a communication interface to enable electronic transfer/delivery of images in a communication link (e.g., WiFi and/or SIM enabled wireless communication link) directly to matching party 502 requesting party 506 and/or a cloud entity (not shown). Additionally, to fulfill requirements of an order provided by requesting party 506, an image capture device worn by wearing party 504 may employ techniques to confirm a valid presence at a location and/or at a specified date/time using, for example, location based services (e.g., GPS), tokens and/or a "check-in" application, and/or a real-time clock. Furthermore, an image capture device worn by wearing party 504 may include a microphone to receive voice commands and/or microphone to accept offers of compensation make voice commands to save, label and/or process captured images. In an alternative implementation, an image capture device worn by wearing party 504 may be implemented with a head up display to direct wearing party 504 to potential bounties (e.g., established by requests provided by requesting entity 506 to matching entity 502).

Figure 6:
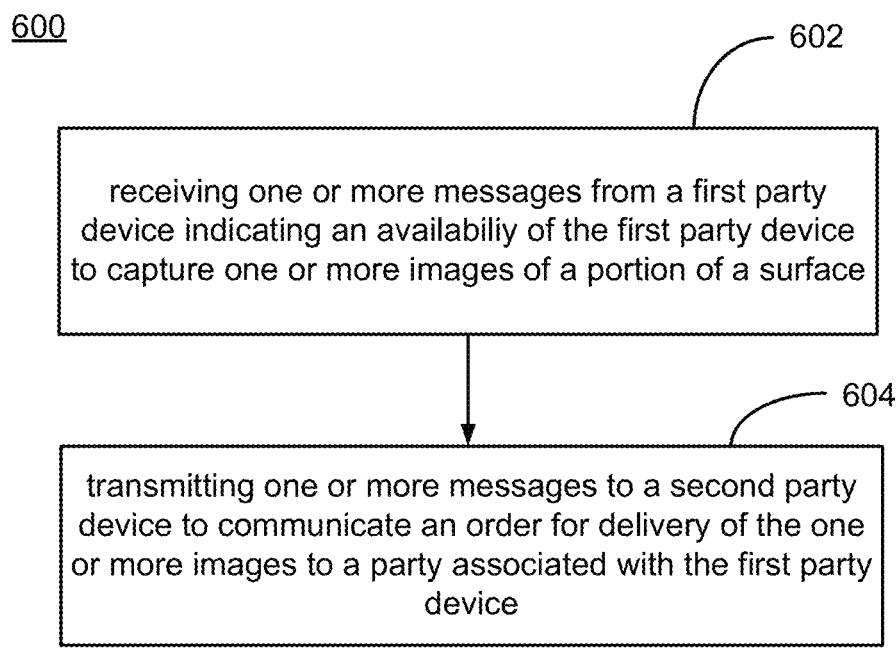
FIG. 6 is a flow diagram of a process for facilitating capture of an image of a marked surface by a first party for a second party requesting such capture, according to an embodiment.

FIG. 6 is a flow diagram of a process 600 for facilitating capture and/or sharing of an image of a marked surface by a first party for a second party requesting such capture, according to an embodiment. In an example implementation, a request (e.g., from requesting party 506) may trigger delivery of an image captured and/or to be captured by a third party (e.g., wearing party 504). In a particular implementation, process 600 may be performed, in whole or in part, by a computing device associated with matching entity 502. Block 602 may comprise, for example, receipt of one or more messages from a party (e.g., requesting party 506) specifying an order for delivery of one or more images of visual content presented by a marked surface. According to an embodiment, a captured image of visual content presented by a marked surface to be delivered by a wearing party may be delivered to matching party 502 along with associated metadata such as, for example, a date/time stamp and/or location parameters associated with the captured image. In a particular implementation, such metadata may enable matching entity 502 to prevent fraud based, at least in part, on such location parameters, data/time stamp and/or other metadata delivered in conjunction with captured image content. Such a data/time stamp may also enable matching entity 502 and/or requesting entity 506 to determine contract compliance and/or enforce contracts to provided requested captured images of marked surfaces (e.g., contacts to provide a requested captured image of a marked surface within a time window specified in an order). Such a data/time stamp may also enable matching entity 502 to identify a most recently captured image of visual content presented in a marked surface from among multiple captured images of the marked surface (e.g., for fulfilling a request from a requesting party 506).

In an embodiment, compensation to be provided to a wearing party 504 may be determined by matching party 502 and/or requesting party 506. Such compensation may be determined to be sufficiently high to induce wearing party 504 to take action to obtain a captured image of a marked surface desired by requesting party 506. Alternatively, messages from wearing party 504 to matching party 502 may indicate compensation that may be expected by wearing party 504 to provide captured images. In a particular implementation, block 602 may receive messages that are transmitted by a device associated with a requesting party 506 (e.g., a mobile phone and/or smart glasses 100).

Block 602 may comprise receipt of one or more request messages such as receipt of one more request messages transmitted by computing devices associated with one or more requesting parties 506. Such request messages may comprise orders specifying parameters of a requested image to be delivered as described above. Block 604 may then transmit one or more messages received in block 602 to communicate to one or more wearing parties 504 an order for delivery of such a captured image based, at least in part, on messages received at block 602.

According to an embodiment, messages transmitted at block 604 may indicate a request for a subscription to capture of an image of a surface at different times and/or periodically. As discussed above, a wearing party 504 may capture an image of visual content presented on a marked surface for compensation provided by a requesting party 506. In an implementation of system 500, matching entity 502 may facilitate a subscription service for a requesting party 506 such that a wearing party 504 may fulfil an order by delivery of captured images of specified marked surfaces over a duration and/or at specific times. In another particular implementation, such a subscription service for a requesting party 506 may be fulfilled by captured images of a marked surface obtained by multiple different wearing parties. For example, a 'subscription' by requesting party 506 may result in matching party 502 automatically creating new (e.g., repeating) orders at a specified interval where each order need not be fulfilled by the same wearing party 504.

As pointed out above, block 604 may forward orders to wearing parties 504. A computing device associated with matching entity 502 may also provide one or more messages to a wearing party 504 enabling display of outstanding orders for capture of an image of a marked surface in proximity to a current location of wearing party 504 along with a bounty offered for obtaining associated captured images.

For simplicity, embodiments described above in system 500, an image capture device (e.g., worn by wearing party 504) may be implemented in pair of smart glasses. It should be understood, however, that different types of devices may be used. While particular implementations may include delivery of captured image content from wearing party 504 to requesting party 506 (e.g., directly and/or through matching party 502), such delivery may also be implemented via batch transfer of captured image content (e.g., when smart glasses are placed in a WiFi-enabled charging case, or connected via a Bluetooth link to a device with network connectivity to matching entity 502 and/or requesting party 506). In this context, "delivery" of captured image content may comprise transmission of encoded signals and/or states to express and/or represent portions such image content over a communication network, initiation of such transmission of encoded signals and/or states through third party device, or tendering a hardcopy of the captured image content, just to provide a few examples of how captured image content may be delivered.

While a smartphone may be used as an image capture device, such a smartphone may be of limited use for capturing images of visual content presented on a marked surface. Implementing an image capture function in smart glasses to be worn at eye level may provide improved alignment with a primary function of smart glasses. Automatic image capture by a device worn at eye-level may further improve upon use of a smartphone-based solution (which may require deliberate action by a user to capture an image). This may allow a wearing party 504 to easily/seamlessly/automatically/and in the background capture images of marked surfaces as the wearing party 504 moves naturally throughout the day (e.g., without deliberately removing a smartphone from a pocket to capture an image of a specific marked surface as wearing party 504 becomes aware of the marked surface). As such, smart glasses with aforementioned image capture capabilities may enable capture of images of an increased number of marked surfaces (and possibly greater income) for a wearing party 504 with less time, effort and/or attention.

According an embodiment, an individual may desire to review a history of marked surfaces viewed by the individual (e.g., marked surfaces viewed by that individual of the course of journey). Here, such an individual may wear smart glasses with a camera to capture images of surfaces (e.g., marked surfaces), and maintain the captured images in a library (e.g., stored in the cloud). As pointed out above, such smart glasses worn by the individual may automatically capture images of visual content of a marked surfaces responsive to signals provided by surface markers embedded and/or affixed to marked surfaces. In an implementation, such captured images may be location and/or time stamped to enable convenient access and retrieval of captured images in the future. In an embodiment, such a library of images may, in effect, enable an individual to augment memory and/or extend awareness of past events. For example, an individual/user may not have noticed whether salmon in a store display was advertised as farm raised or wild caught. If an image of the displayed salmon was automatically captured (e.g., responsive to signals provided by surface markers), for example, the individual/user may access a surface capture history to determine whether to return to the store to purchase the salmon.

In an embodiment, images in an image capture history may include metadata extending beyond metadata currently available by a smartphone camera. In addition to date, time and/or location, metadata stored in association with a captured surface image may include unique identifiers (IDs) associated with a marked surface (e.g., obtained from signals provided by surface markers in the marked surface). Such unique IDs stored in association with captured images in a library may enable organizing/searching primarily by unique ID and secondarily by date/time. This may enable efficient storage, retrieval, and viewing images of a particular surface to view/compare how the particular surface has changed over time (surface change history). Using a unique ID associated with a marked surface (e.g., metadata gathered by the surface capture hardware from surface markers) as a primary index and date/time as a secondary index, captured surface images may be organized for easy recall and comparison to historic versions. In a case in which a marked surface is a price tag, for example, an individual may easily scroll through a price history over time to determine, for example, whether a price has changed over the course of a year.

In an embodiment, storage and retrieval of captured surface images (e.g., images captured personally by an individual to compile a history of surfaces viewed by the individual) may be interleaved with additional captured surface images obtained from a third party (e.g., wearing party 504 as discussed above). Using a unique ID associated with a marked surface of interest, an individual may access a history of captured surface images to retrieve images of the marked surface of interest that were obtained by the individual (e.g., from surface capture glasses worn by the individual) and/or obtained by the third party. According to an embodiment, a worn image capture device (e.g., smart glasses 100) may be integrated with other devices worn by and/or co-located with a subject/user/wearer. Such other devices worn by and/or co-located with a subject/user may include, for example, earphones (e.g., ear buds), a microphone, speaker, smart phone (e.g., communicatively coupled to an image capture device via a wireless communication link), body sensors, navigational/inertial sensors (e.g., GPS receiver, accelerometers, gyroscope, magnetometer, etc.), just to provide a few examples. In a particular implementation, such other devices may operate and/or be placed in different operational modes to, for example, adapt such devices for operation for particular situations, locations, contexts, etc.

Such different operational modes may be defined, for example, based on one or more mode and/or state parameters that may be set by a subject/user/wearer. Alternatively, such mode and/or state parameters may be automatically set responsive to detected conditions and/or events. In a particular implementation, such parameters may be automatically set responsive to signals provided by surface markers disposed on and/or in a marked surface and received/processed at an image capture device (e.g., smart glasses 100). As discussed herein, signals provided by surface markers may indicate, for example, a unique identifier associated with a marked surface and/or location identifiers. These signals, and other signals, may be indicative of a particular environment and/or context suggesting a possible change in mode and/or state parameters. In one embodiment, signals provided by a surface marker to indicate a transition in environmental context may be included as metadata. For example, such metadata may indicate a named context (e.g., "work," "home," "school," "garden," etc.) and/or specify parameters to effect a change in operational mode of a worn device.

In an example, signals provided by a surface marker may act as a visual cue to signify to a worn image capture device (with surface capture hardware) that an environmental context transition has occurred and/or to directly instruct a change in device mode (including a change in device mode to what would be more appropriate for a particular environmental context). Such a change in mode and/or state parameters may trigger actions causing direct changes in device mode such as turning off noise cancellation (e.g., if approached by a law enforcement officer with a surface marker on officer's clothing that is so interpreted by an image capture to suggest transition to a context requiring focused attention to the approaching officer).

In one embodiment, a signal provided by a surface marker may trigger a change in a device mode such as, for example, a change from a noise cancelling mode to a passthrough amplification mode in a device concept that includes earbuds. In another implementation, a signal provided by a surface marker may trigger a device and/or device sub-component to be placed into a power saving mode or turned off completely. In another implementation, a signal provided by a surface marker may trigger a device to update parameters of one or more of on-device machine-learning models, where updated machine-learning models are more appropriate for the given context, for example. In one particular use case, upon receiving signals from surface markers disposed on and/or in a door of a theater or house of worship, a device may be triggered to transition to a silent mode to disallow interruption.

In an embodiment, use of surface markers to signal environmental context transitions may enable greater efficiencies over inferring environmental context based on computationally intensive techniques to process sensor signals (e.g., signals provided by environmental sensors). Additionally, use of surface markers to signal environmental context transitions may enable increased device customization, improved privacy and/or extended battery life under certain conditions. In a particular scenario, a non-technical user may apply surface markers to surfaces of his/her environment as a method of programming the user's device responding to particular environmental contexts associated with locations of the surfaces. For example, a device owner may strategically place marked surfaces in particular locations of associated environments to indicate transitions in environmental context (e.g., in a garage, on desk at work, on the inside cover of a notebook to indicate 'studying' etc.).

In another embodiment, a user may preconfigure an image capture device to respond to signals to be provided by surface markers disposed on and/or in pre-existing marked surfaces that the user may encounter in varied environmental contexts in a typical day. In a particular implementation, a user may incorporate a history of captured surfaces as discussed above by selecting a particular captured marked surface in the history and designating/associating the captured marked surface with a particular environmental context. In one example, a user may associate a captured marked surface located at a morning bus stop to represent an environmental context of "commute." In another example, a user may associate another captured marked surface located at a front door of a workplace with an environmental context of "work." In another example, a user may associate another captured marked surface located at a local trailhead with an environmental context of "exercise." In another particular implementation, a user may define an extended set of rules to define transitions to particular environmental contexts based, at least in part, on signals provided by a surface marker.

According to an embodiment, monitoring of an individual's behavioral and/or biological response to visual images may be useful in any one of several applications such as, for example, optimization of effectiveness of visual advertisements, point of purchase displays or packaging, just to provide a few examples. For example, if an infrastructure provider desires to micro-target advertising (e.g., online advertiser and/or online merchant), such an infrastructure provider may be interested in a typical consumer's response/reaction to enable greater insight into consumer interests. While on-line advertisers and merchants may monitor explicit clicks, purchase history, time on page, etc. via an online interface, these observations may be of limited utility in determining consumer interests, for example. Additionally, a business owner may be interested in how individuals respond to the owner's viewable surface content such as, for example, visual content presented on a billboard, advertisement, menu, shop window, display case, etc. Accordingly, it may be useful to automatically capture, format, and package together any number of observations of user reactions/responses to particular viewable surfaces to obtain greater insights into consumer interests as a transaction environment extends beyond use of traditional online interactions.

According to an embodiment, a process may create a Detailed Surface Attention Log (DSAL) associated with a particular visual surface that includes observations of reactions/responses to the particular visual surface by an individual. In an implementation, a DSAL may package parameters indicative of an individual's reaction/response to a captured image of a marked surface in association the marked surface. Such a DSAL may be shared (e.g., via a cloud service) for aggregation and/or analytics. Alternatively, such a DSAL may be prepared upon request by a party. Once created, a DSAL may be delivered to and/or shared with a platform provider, matching party, business, etc. In a particular implementation, a DSAL associated with a defined "surface" (e.g., marked surface as described above) may gather and/or package observations of user reactions/responses corresponding to the defined surface. A DSAL may be multi-factored to included multiple components, where a particular component of a DSAL may represent an associated overlay to characterize an individual's reaction/response to a particular surface as enabled, for example, by device components such as sensors, specialized co-processors, etc. Once created, a DSAL may be used/aggregated/post-processed to provide insight into consumer interests and/or provide insight into the effectiveness of advertisements, for example.

One technique for collecting observations of an individual's response/reaction to a surface may comprise obtaining observations of such an individual's involuntary response/reaction while the individual is viewing portions of the surface. According to an embodiment, devices worn by an individual may include sensors that generate signals responsive to a user's voluntary and/or involuntary reactions/responses (e.g., involuntary biological reactions/responses). In a particular example, smart glasses (e.g., smart glasses 100) may include one or more eye-tracking sensors for tracking an angle of a wearer's gaze relative to an orientation of the smart glasses, and may include one or more inertial sensors (e.g., accelerometers, gravitometers, gyroscopes and/or magnetometers) for tracking the orientation of the smart glasses relative to viewable surfaces. According to an embodiment, a wearer's gaze relative to a viewable surface may be tracked based, at least in part on a tracked orientation of such smart glasses relative to a viewable surface, and the wearer's gaze relative to the orientation the smart glasses.

Figure 7:
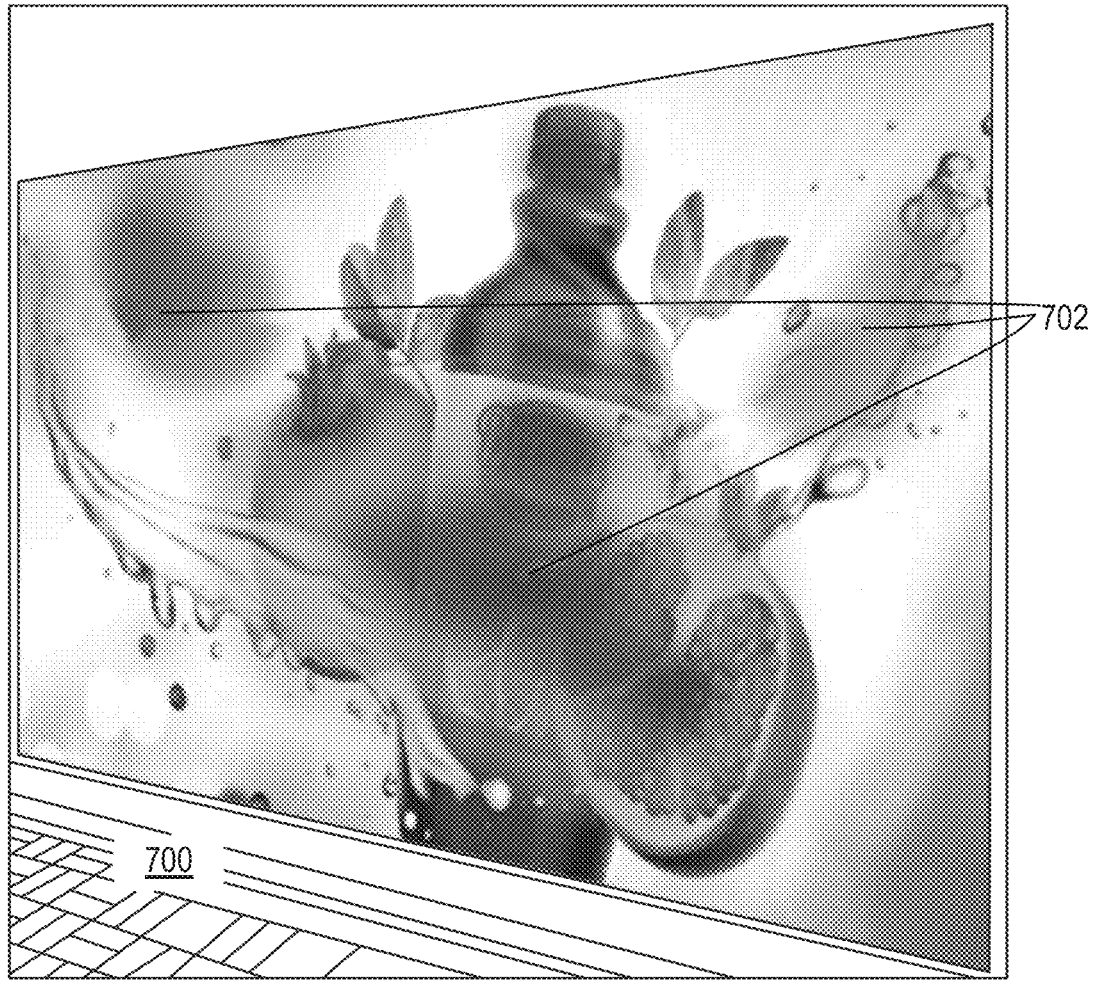
FIG. 7 is a depiction of a heatmap tracing eye movement over a marked surface according to an embodiment.

In an implementation, a wearer's tracked gaze may be mapped to portions of a viewable surface of interest to generate an "attention heatmap". FIG. 7 is a depiction of an attention heatmap tracing eye movement over a marked surface 700 according to an embodiment. In the particular example, marked surface 700 is an advertisement for a beverage. Cloudy portions 702 laid over features of marked surface 700 may express a heatmap 702 indicating features that attracted a wearer's gaze (e.g., as tracked by eye-tracking sensors embedded in smart glasses worn by the wearer). Darker portions of attention heatmap 702 may represent a more concentrated/lengthier gaze while lighter portions may indicate a less concentrated/briefer gaze. According to an embodiment, heatmap 702 may assist in determining an effectiveness of particular visual features in an advertisement in attracting attention of a potential consumer. Similarly as shown in FIG. 8, a marked surface 802 presents visual content comprising daily specials offered in a restaurant and heatmap 804 shows a cloudy portion that overlaps with a "WEDNESDAY—WINE DOWN" portion of marked surface 802.

According to an embodiment, a wearer of a device (e.g., smart glasses 100) may have a cognitive and/or physiological response to something that the wearer views and/or gazes. Such cognitive and/or physiological responses may include, initiate and/or lead to, for example, the wearer's curiosity, interest, pleasure, fright, hunger, anger, fatigue, dehydration, focus, regret, or any other behavioral and/or emotional reaction, just to provide a few examples. Such cognitive and/or physiological responses may initiate involuntary responses by the wearer that are measurable and/or detectable by sensors. Such sensors may include, for example, sensors capable of monitoring eye blinking (e.g., for monitoring a frequency of eye blinking), tracking directional movement of eyes, detecting and/or measuring a pupillary response, measuring small magnetic fields produced in a brain (e.g., to perform a magnetoencephalography (MEG) scan), measuring changes in body temperature, measuring and/or detecting changes in electrical impedance, heartrate, breathing rate or perspiration, just to provide a few examples of sensors capable of measuring and/or detecting involuntary responses by a wearer.

Figure 8:
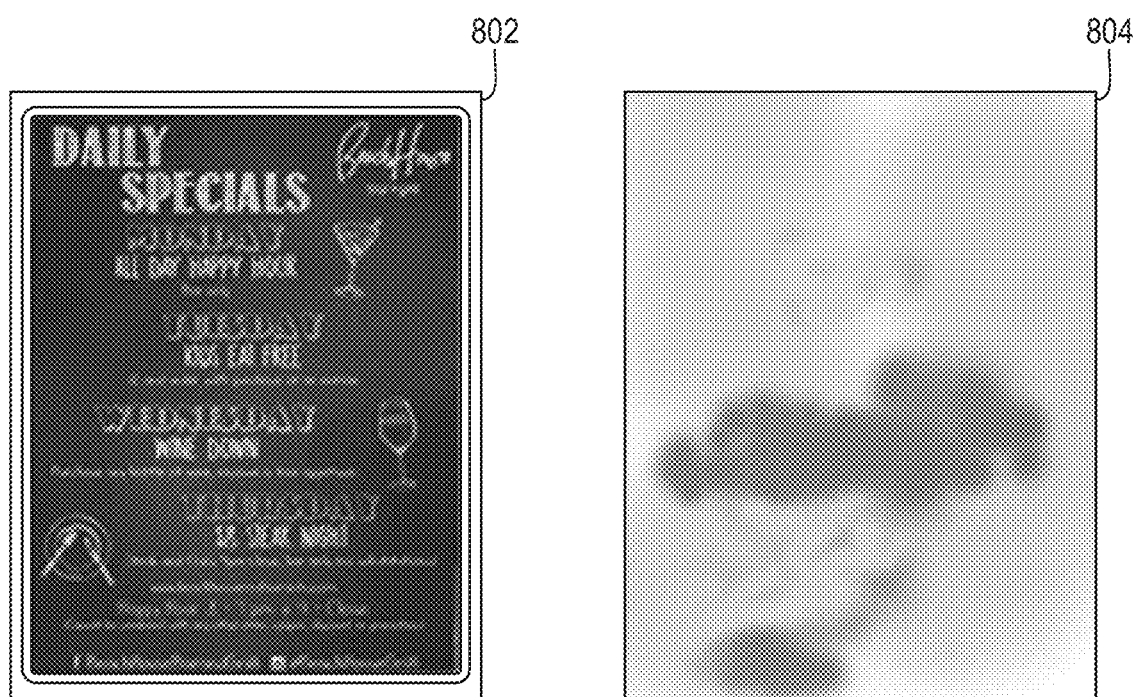
FIG. 8 is a depiction of a marked surface and corresponding heatmap tracing eye movement over a marked surface according to an embodiment.

In one particular implementation, a gaze of a wearer (e.g., as captured in an attention heatmap as illustrated in FIGS. 7 and 8) may be temporally correlated with involuntary and/or physiological responses of the wearer to, for example, infer how features in a marked surface cognitively and/or emotionally affect the wearer. As pointed out above, a DSAL may comprise content that includes observations of reactions/responses of a particular individual to a particular marked surface from an interaction of the particular individual with the particular marked surface. For example, a DSAL may represent an individual's specific interaction with a specific marked surface at a particular time and/or viewing event. Once created, a DSAL may be shared/transferred immediately, or in batch on a periodic basis (e.g., at the end of a day when a capture device is connected to a home Wi-Fi network, or placed into charging case as discussed above). DSALs may be aggregated and analyzed (e.g., employing a cloud service) to reveal greater insight across a multitude of surface interactions for a single individual and/or for multiple individuals. As such, a DSAL may provide a convenient format to package parameters that are to be transferred for further processing. According to an embodiment, content for a DSAL may contain multiple formatted fields and/or items including, for example, metadata, captured image content, an attention heatmap and/or behavioral profile content. Behavioral profile content may reflect/indicate, for example, user feelings, emotions, mental states. This may indicate, for example, whether an associated individual is hungry, excited, engaged, pleased, fatigued, dehydrated, surprised, disgusted/repulsed, angry, distracted, curious, etc.

In particular implementations, a DSAL need not include a captured image of a surface, an attention heatmap and behavioral profile content. For example, a DSAL may merely comprise behavioral profile content in association with a surface identifier (e.g., identifier of a surface being viewed). Nonetheless, a DSAL including a captured image of a surface, an attention heatmap and behavioral profile content may be particularly useful in some applications such as, for example, streaming content to be viewed by a subject (e.g., games and/or video on-demand service). Here, a set of surface markers may be inserted into a video stream and observations and/or measurements of viewer reaction/responses (voluntary or involuntary reactions/responses) may be observed and logged. In this case, an associated image capture of a marked surface (having streamed content presented thereon) may also be implemented, as the streamed visual content may be changing. This may also be applicable in a particular case in which inserted surface markers and streamed surface content are being provided by separate systems (e.g., non-integrated systems) and by different parties.

A metadata field and/or item in a DSAL may include, but not necessarily be limited to, metadata as gathered from signals provided by surface marker disposed in and/or on a marked surface (e.g., a unique surface identifier, surface type, etc.), a user account identifier associated with a wearer of an image capture device, a timestamp corresponding to a time that an image of a surface is captured (e.g., instant that a still image is captured, or start and end times that a video image is captured), location identifier (e.g., GPS coordinates or street address, if available), just to provide a few examples of parameters that may be included in metadata of a DSAL. A metadata field and/or item may also include demographic descriptors of a wearer (e.g., age, gender, etc.). Such demographic descriptors may be especially valuable for cases in which a wearer has agreed to sharing into a system that is to anonymously aggregate reactions by multiple different individuals to visual content of a marked surface.

In one particular embodiment, one or more computing devices may be integrated with a device worn by an individual (e.g., smart glasses 100, smart watch and/or mobile phone) to process signals generated by one or more sensors responsive to one or more of the aforementioned involuntary and/or physiological/behavioral responses by the individual. Such a computing device may comprise a behavioral processing unit 920 shown in FIG. 9.

Figure 9:
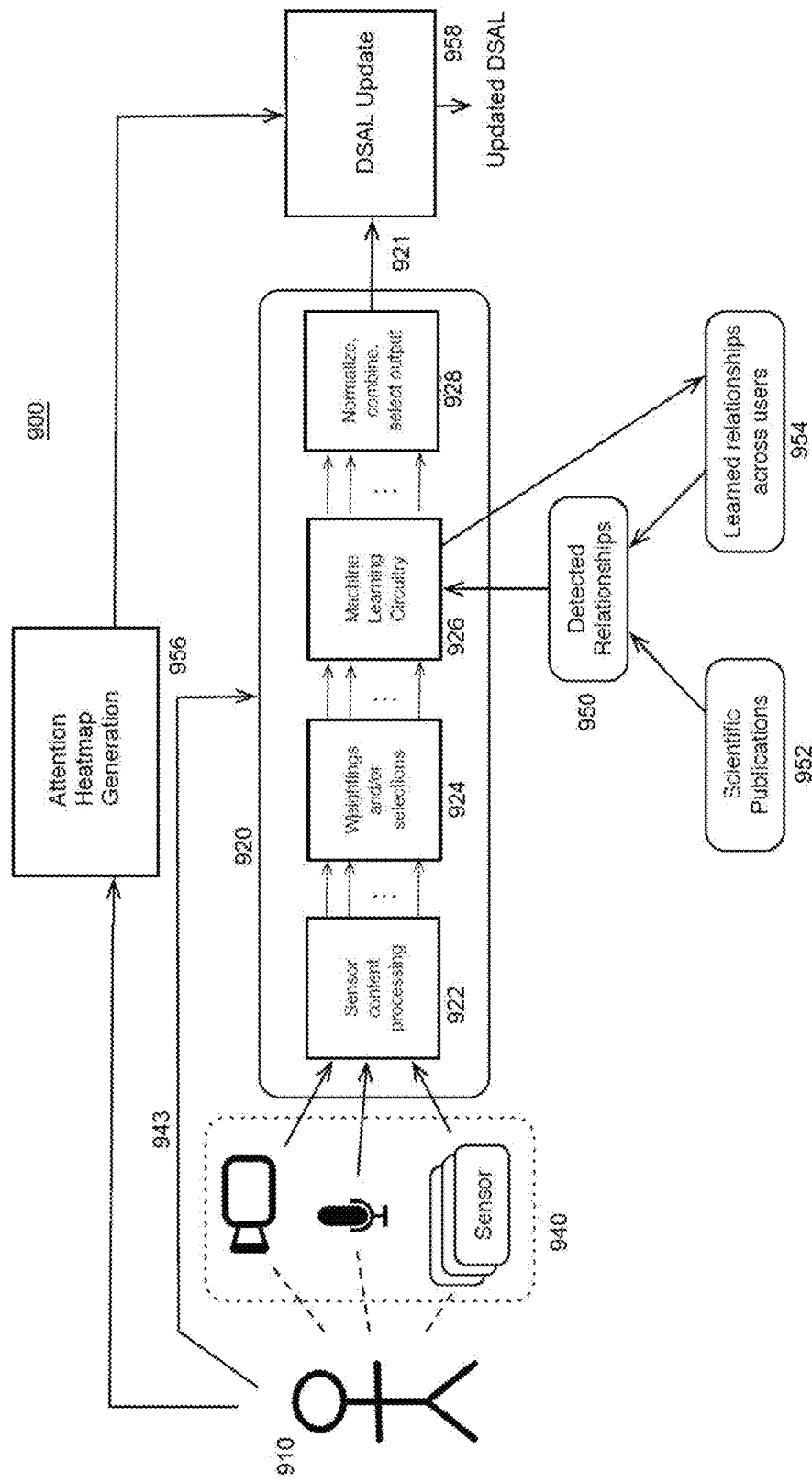
FIG. 9 is a schematic diagram of a system to capture behavioral profile content according to an embodiment.

FIG. 9 is an illustration of an embodiment 900 of a system, including a processor, such as a behavioral processing unit (BPU) 920, to process signals and/or states representative of behavioral content in a computing device. According to an embodiment, all or a portion of embodiment 900 may be embedded in an image capture device to be worn by a user/wearer. In an embodiment, to generate behavioral profile content, such as behavioral profile content 921, for a particular user, such as user 910 (e.g., wearer of a device), a processor, such as behavioral processing unit 920, may obtain signals and/or states representative of content from one or more sensors, such as one or more of sensors 940. Also, in an embodiment, a processor, such as behavioral processing unit 920, may process sensor content, such as content from one or more of sensors 940, to generate behavioral profile content, such as behavioral profile content 921, for a particular user. In an embodiment, a processor, such as behavioral processing unit 920, may include behavioral content processing circuitry. For example, a processor, such as behavioral processing unit 920, may include sensor content processing circuitry, such as circuitry 922, and/or may include machine learning circuitry, such as circuitry 924 and/or 926, in an embodiment. In an embodiment, a processor, such as BPU 920, may further obtain content from sensors, such as sensors 940, to track and/or measure one or more environmental aspects (e.g., environmental sound, temperature, barometric pressure, altitude, location, etc.).

According to an embodiment, sensors 940 may include a "world-facing" camera (e.g., a camera integrated with smart glasses 100 to capture images of subject matter being viewed by a wearer) to provide parameters to be captured in a DSAL. For example, images captured in such a world-facing camera may be used to further contextualize measurements and/or observations obtained from other sensors 940 in determining behavioral profile content.

In an embodiment, a processor, such as behavioral processing unit 920, may provide circuitry to generate, at least in part, behavioral profile content, such as behavioral profile content 921, for a particular user, such as user 910, to be utilized for any of a wide range of possible applications and/or purposes. For example, a processor, such as behavioral processing unit 920, may generate behavioral profile content, such as behavioral profile content 921 to characterize a reaction by user 910 to environmental stimuli such as portions of visual content presented by marked surface, for example. In an embodiment, behavioral profile content, such as behavioral profile content 921, may include one or more parameters indicative of and/or responsive to eye movement (e.g., frequency of eye blinking or directional movement of eyes), voice and/or speech aspects, pupillary response, MEG scan measurements, changes in body temperature, changes in electrical impedance, heartrate, breathing rate or perspiration, for example.

In an embodiment, one or more sensors, such as sensors 940, may provide content representative of various aspects of a particular operator's biological and/or behavioral state, and/or representative of one or more environmental factors and/or other external factors. Sensors 940 may be embedded in one or more devices worn by wearer 910 such as, for example, smart glasses (e.g., smart glasses 100), virtual reality (VR) headset, mobile phone, watch, clothing, attached sensors to monitor subcutaneous fluid, just to provide a few examples. In an embodiment, sensors 940 may include one or more sensors of one more sensor types, as previously mentioned. Further, in an embodiment, a processor, such as behavioral processing unit 920, may include circuitry, such as circuitry 922, to process content obtained from one or more sensors, such as sensors 940. In a particular implementation, behavioral processing unit 920 may be embedded with devices that include one or more sensors 940 embedded therein. Alternatively, behavioral processing unit 920 may be communicatively coupled to sensors 940 by a wireless communication link.

In an embodiment, content obtained from sensors, such as sensors 940, may include digital signals and/or states, analog signals and/or states, or any combination thereof. For example, circuitry 922 may include digital circuitry, analog circuitry, or a combination thereof. In an embodiment, sensor content processing circuitry, such as circuitry 922, may convert one or more analog signals to digital signals, although subject matter is not limited in scope in this respect. In an embodiment, circuitry, such as circuitry 922, may process signals and/or states from one or more sensors, such as sensors 940, to combine, coordinate, normalize, amplify, filter, and/or otherwise condition signals and/or states from one or more sensors, such as sensors 940, although subject matter is not limited in scope in these respects.

Further, in an embodiment, a processor, such as behavioral processing unit 920, may include circuitry for determining and/or selecting weighting parameters and/or for determining and/or selecting particular machine learning devices, systems, and/or processes. For example, circuitry 924 may determine and/or select one or more particular machine learning techniques, such as one or more particular neural networks and/or including one or more weighting parameters, for example, for use in machine learning operations. In an embodiment, determination and/or selection of weighting parameters and/or machine learning operations, including one or more neural networks, for example, may be based, at least in part, on content, such as parameters 543, identifying one or more aspects of substances consumed by a particular user, such as user 910.

In an embodiment, machine learning circuitry, such as machine learning circuitry 926, may, at least in part, process content, such as may be obtained from circuitry 922 and/or 924, to determine, estimate, and/or infer, for example, one or more parameters representative of a substantially current biological and/or behavioral state of wearer 910. In an embodiment, machine learning circuitry, such as machine learning circuitry 926, may generate, at least in part and/or with contribution from output generation circuitry 928, a representation of a biological and/or behavioral state of wearer 910, such as behavioral profile content 921. In an embodiment, behavioral profile content, such as 921, may include a plurality of parameters representative of degrees of excitement, anger, fear, fatigue, dehydration, or focus/distraction, pre-breakthrough, silent like, regret/error acknowledgment, hunger, sloppiness/precision, empathy, social engagement level, interest, pleasure or curiosity, or any combination thereof, for example. In an embodiment, a processor, such as behavioral processing unit 920, may repetitively and/or substantially periodically obtain sensor content (e.g., from sensors 940) and/or may repetitively and/or substantially periodically generate behavioral profile content, such as behavioral profile content 921, for a particular user, such as user 910. Further, as mentioned, behavioral profile content, such as behavioral profile content 921, may include one or more parameters indicative of voice tonality, voice sentiment, volume, frequency, pitch, timbre, etc. Further, as also mentioned, behavioral profile content, such as behavioral profile content 921, may include one or more parameters representative of eye darting, blinking rate, ability to focus, and/or pupil dilation, to name a few additional non-limiting examples.

In an embodiment, a processor, such as behavioral processing unit 920, may determine appropriate weights for various sensor combinations and/or for particular parameters, such as parameters provided by one or more content providers, for example. In an implementation, such weights may be affected by environmental parameters (e.g., obtained from measurements and/or observations) and/or context parameters associated with a particular marked surface such as a surface type (e.g., as signals provided by surface markers provided on/in a particular surface). In another embodiment, during online operation, for example, a set of inputs may be logged and/or later used as training parameters. For example, a user, such as user 910, may explicitly provide inputs related to interests, likes, dislikes, inputs related to behaviors indicative of over-excitation and/or indicative of other observed behaviors for a particular individual, for example. Further, in an embodiment, determined and/or substantially known relationships, such as represented by parameters 950, may include relationships between behavioral profile content and/or user states and/or may include scientifically determined relationships. For example, parameters, such as parameters 952, indicative of relationships between and/or among content that may be gleaned from sensor output and aspects of a user's behavioral and/or biological state may be determined, at least in part, via one or more scientific publications. In an embodiment, parameters, such as parameters 954, representative of other relationships may be determined across multiple users and/or across populations, for example.

According to an embodiment, an attention heatmap generation processor 956 may generate an attention heatmap as illustrated in FIGS. 7 and 8, for example. Heatmap generation processor 956 may generate an attention heatmap based, at least in part, on observations obtained from sensors 940 that enables tracking a gaze of wearer 910 relative to a viewable surface. In an embodiment, an attention heatmap generated by heatmap generation processor 956 may include one or more time stamps to associate a wearer's gaze to a particular time reference. Likewise, behavioral profile content 921 may be generated with a similar time stamp to reference observations of behavioral content with attention heatmaps generated by attention heatmap generation processor 956.

According to an embodiment, DSAL updated processor 958 may combine an attention heatmap generated by attention heatmap generation processor 956 and behavior profile content 921 generated by behavioral processing unit 920 to generate and/or update a DSAL associated with one or more marked surfaces. For example, DSAL update processor 958 may generate and/or update a DSAL associated with a marked surface that is the subject of a current attention heatmap generated by attention heatmap generation processor 956.

According to an embodiment, a tracked gaze of a subject may be projected to specific locations of a marked surface. Behavior profile content may then be temporally associated with such projected specific locations of the marked surface for creating one or more records of the at least some of the behavioral profile content in temporal association with the projected locations of the image. These records may then be included in a generated and/or updated DSAL. Using information from such a generated and/or updated DSAL, a third party may alter a visual appearance of the marked surface based, at least in part, on the behavioral profile content in temporal association with the projected locations on visual content presented by the marked surface (e.g., by pinpointing how a subjects behavioral content was affected by temporally associated projected locations on visual content presented on a marked surface).

According to an embodiment, over time multiple individuals may view a marked surface while wearing devices such as smart glasses 100, for example. Such an individual's reaction to viewing a marked may be captured in a DSAL. Here, a generated and/or updated DSAL for a marked surface produced by DSAL update processor 958 may be based, at least in part, on an interaction of an individual with a marked surface to be recorded as an attention heatmap and associated behavioral content generated from the individual viewing the marked surface. According to an embodiment, a DSAL or updates to a DSAL generated by DSAL processor 948 may be transmitted to a centralized location such as a cloud data store (e.g., where transfer may occur immediately or periodically via batch transfers when a surface capture device is connected to a home WiFi network, for example). Likewise, a completed/updated DSAL may be made available for a subscriber, for different applications, as input to other processing systems (such as inputs to artificial intelligence and/or machine learning algorithms) to leverage DSALs to gain insight about consumer interests, changes in consumer interest, advertising effectiveness, etc.

According to an embodiment, specific representations fields and/or items expressed in a DSAL (e.g., as generated and/or updated by DSAL update processor 958) may be chosen to optimize any number of system parameters such as, for example, optimize use of limited data transmission throughput for transfer, or optimize for direct consumption and/or processing by machine learning algorithms. Additionally, formats for expressing an attention heatmap (e.g., at attention heatmap generation processor 956) may take various forms including, for example, a time series representation of gaze points projected onto locations of a marked surface, a single 2D color-saturated image, etc., or any one of several formats that may be reduced to a digital state (e.g., for transmission in a transmission medium and/or storage in a storage medium). Likewise, formats for representing behavioral profile content (e.g., behavioral profile content 921 generated by behavioral profile content processing unit 920) may include any one of several formats including a time series representation of a behavioral profile vector, an aggregation of behavioral profile content aggregated across an entire duration of user 910's encounter with a marked surface. It should also be understood that a DSAL may also indicate an absence of a gaze projected on to visual content presented on a marked surface (or specific locations of interest on such a visual content), which may be indicative of a wearer's disinterest in visual content presented on a marked surface and/or visual content that is ineffective at attracting attention. In one implementation, generation and/or update of a DSAL may initiate an immediate communication (e.g., message) to a wearer based on the wearer's reaction to particular visual content presented on a marked surface. This may be facilitated, for example, by a service that is primed to interact with wearer's while at a location where the particular marked surface is being viewed.

As indicated above, observations maintained in a DSAL may be of value to advertisers, merchants and/or owners of marked surfaces. In an embodiment, signals provided by surface markers disposed in and/or on a marked surface may include a request message to solicit receipt of a DSAL (e.g., receipt of a DSAL in a signal packet transmitted over a communication network) in a from a device worn by an individual viewing the marked surface. For example, such a request message may specify compensation to be received in exchange for receipt of such a DSAL. In one implementation, the individual viewing the marked surface may actively agree to provide a DSAL for the offered compensation. Alternatively, the device worn by the individual may be programmed with a set of rules to automatically accept or reject the request message based, for example, on the offered compensation and/or other conditions. In a particular implementation, an artificial intelligence assistant hosted on a worn device may decide whether to send a DSAL to a specified delivery location (e.g., URL specified in request message) based, at least in part, on user-defined settings, rules and/or learned preferences. Here, such a DSAL may be automatically created by a worn device (e.g., with no additional action by an individual wearing the worn device) and delivered to an advertiser, merchant and/or owner of a marked surface (e.g., in signal packets over a communication network). In an embodiment, such a DSAL may be delivered directly from a worn image capture device to advertisers, merchants and/or owners of marked surfaces for use evaluating effectiveness of visual content presented on the marked surface.

According to an embodiment, a request message to solicit receipt of a DSAL from a device worn by an individual may specify different levels of offered compensation based, at least in part, on specific types (e.g., specific parameter fields) of DSAL parameters that are being requested (e.g., particular raw sensor measurements and/or inferred observations generated by a BPU). Such an ability to set a particular offered compensation level based on specific requested DSAL components may accelerate an evolution of client devices for which sensors become increasingly sophisticated, resulting in observations of biological and/or behavioral reactions that are increasingly more valuable to consumers of such observations. Such an ability to set a particular offered compensation level based on specific requested DSAL components may also allow tailoring offered compensation to particular capabilities of client devices to provide a varying detail/richness in DSAL components.

Figure 10:
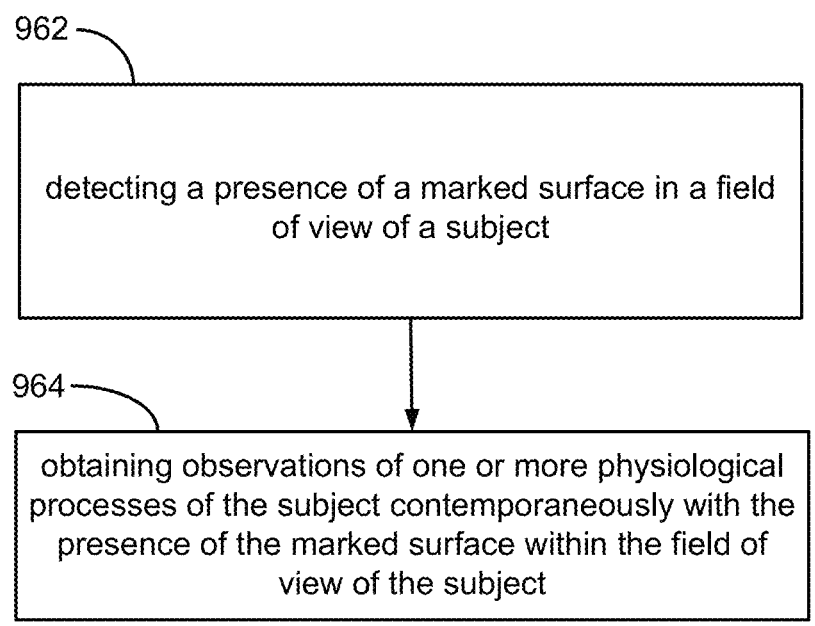
FIG. 10 is a flow diagram of a process for capturing parameters for a marked surface attention log, according to an embodiment.

FIG. 10 is a flow diagram of a process 960 for evaluating human responses to portions of marked surfaces according to an embodiment. Block 962 may track a subject's gaze over a portion of a marked surface. For example, block 962 may track movements of eyes of a wearer of a pair of smart glasses (e.g., smart glasses 100) over features of a marked surface such as a marked surface shown in FIGS. 7 and 8. In an embodiment, block 962 may be triggered and/or initiated by one more or more signals provided by one or more devices embedded in such a marked surface. Additionally, block 962 may comprise generation of an attention heatmap (e.g., by attention heatmap generation processor 956) as illustrated in FIGS. 7 and 8.

Block 964 may comprise monitoring physiological processes of a human, such as a wearer of a pair of smart glasses (e.g., smart glasses 100). For example, block 964 may comprise generating behavioral profile content 921 by behavioral processing unit 920 based, at least in part, on signals generated by sensors 940 responsive, at least in part, by a reaction by user 910 from gazing at features of visual content presented on a marked surface. In a particular implementation, an evaluation of a subject's gaze over features of visual content presented on a marked surface obtained at block 962 may be combined with an evaluation of the subject's physiological processes while gazing over the features obtained at block 964 to generate and/or update a DSAL associated with the marked surface. An orientation of worn smart glasses relative to viewable surfaces may be tracked based, at least in part on a tracked orientation of such smart glasses relative to a viewable surface and the wearer's gaze relative to the orientation the smart glasses. For example, one or more eye tracking sensors may track an angle of a wearer's gaze relative to an orientation of smart glasses, and may include one or more accelerometers for tracking the orientation of the smart glasses relative to viewable surfaces. In a particular implementation, a tracked gaze (e.g., as a tracked angle) may be projected onto specific locations of the viewable surface (e.g., visual content presented on marked surface).

In an embodiment, content, such as behavioral profile content for a particular user, may be tracked, wherein the behavioral profile content may include a plurality of parameters representative of a current behavioral state or biological state, or a combination thereof, of the particular user. Tracked signals and/or states representative of the behavioral content may be stored in at least one memory. Further, an embodiment may include determining, at least in part via at least one processor performing one or more machine learning operations, one or more relationships between and/or among the tracked behavioral profile content and bioavailability or balance, or a combination thereof, of one or more particular substances within a particular user's body. Of course, these are merely examples of how behavioral profile content may be processed and/or otherwise utilized, and subject matter is not limited in scope in these respects.

In an embodiment, content obtained from one or more sensors (e.g., sensors 940) may be processed by particular hardware circuitry to generate behavioral profile content (e.g., behavioral profile content 921) representative of a particular operator's physical, mental, and/or emotional state. For example, a processor, such as a behavioral processing unit, may be dedicated, at least in part, to processing sensor content to generate behavioral profile content representative of a particular operator's physical, mental, and/or emotional state. A processor, such as a behavioral processing unit, may include particular circuitry directed to performing particular operations to relatively more efficiently process sensor content to generate behavioral profile content for a particular operator and/or DSAL, in an embodiment. For example, in an embodiment, a processor, such as a behavioral processing unit, may include machine learning acceleration circuitry directed to performing particular operations that may relatively more efficiently operate on sets of parameters, such as multi-dimensional sets of parameters, that may be utilized in various machine learning techniques such as, for example, neural networks. In an embodiment, a processor, such as a behavioral processing unit, may comprise a co-processor, for example, that may operate in cooperation with a general-purpose processor, although claimed subject matter is not limited in this respect.

As utilized herein, "behavioral profile content" and/or the like refers to one or more parameters representative of a current behavioral state or biological state, or a combination thereof, for at least one particular operator. Thus, for example, "behavioral profile content" and/or the like is not limited to merely behavioral aspects of a particular subject's current state, but may also include parameters representative of one or more biological aspects with respect to a particular subject, as explained more fully herein. Further, although some embodiments herein may be described in connection with "a" user and/or "a" particular user, subject matter is not limited to a single user. For example, at least some embodiments may include behavioral profile content for one or more users, although, again, claimed subject matter is not limited in scope in these respects.

Further, as utilized herein, the term "current" and/or the like refers to substantially and/or approximately current with respect to a point in time. For example, a "current" behavioral and/or biological state of a particular user refers to a behavioral and/or biological state for the particular user derived at least in part from relatively recent sensor content. For example, in an embodiment, behavioral profile content for a particular user may be representative of a behavioral and/or biological state of the particular user derived at least in part from sensor content obtained from one or more sensors within fractions of a second of being generated.

As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Thus, in the context of sensors 940, the term "sensor" and/or the like may include microphones and/or cameras, in an embodiment. Example sensors may include, but are not limited to, one or more accelerometers, gyroscopes, thermometers, magnetometers, barometers, light sensors, proximity sensors, heart-rate monitors, perspiration sensors, hydration sensors, breath sensors, etc., and/or any combination thereof. In an embodiment, one or more sensors may monitor one or more aspects of a particular operator's biological and/or behavioral state.

In an embodiment, behavioral profile content may include a particular specified set of parameters representative of a particular operator's/subject's behavioral and/or biological state that may be utilized, at least in part, by any of a wide range of devices, systems, and/or processes for any of a wide range of applications and/or purposes. In an embodiment, by generating a specified set of parameters comprising behavioral profile content, other devices, systems, applications, and/or processes, for example, may be relieved of responsibility for generating behavioral profile content and may, instead, concentrate on particular areas of expertise and/or specialization. For example, application developers may design applications to take advantage of one or more parameters of behavioral profile content for one or more particular users/subjects without having to incur the costs (time, money, resources, etc.) of developing circuitry, code, etc. for gathering and/or processing sensor content and/or for generating behavioral profile content.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later. Also, the term "connection" may be utilized in a context of a neural network model, and may, in an embodiment, refer to parameters passed between nodes that may include parameters and/or sets of parameters representative of output values, for example. Also, in an embodiment, connections between nodes may include weight parameters. For example, one or more weight parameters may operate in a specified manner on one or more parameters representative of one or more output values to yield a connection, such as between a node of a first layer and a node of a second layer, in an embodiment, for example.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," "parameter," "value," "measurement," "field," "message," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 11:
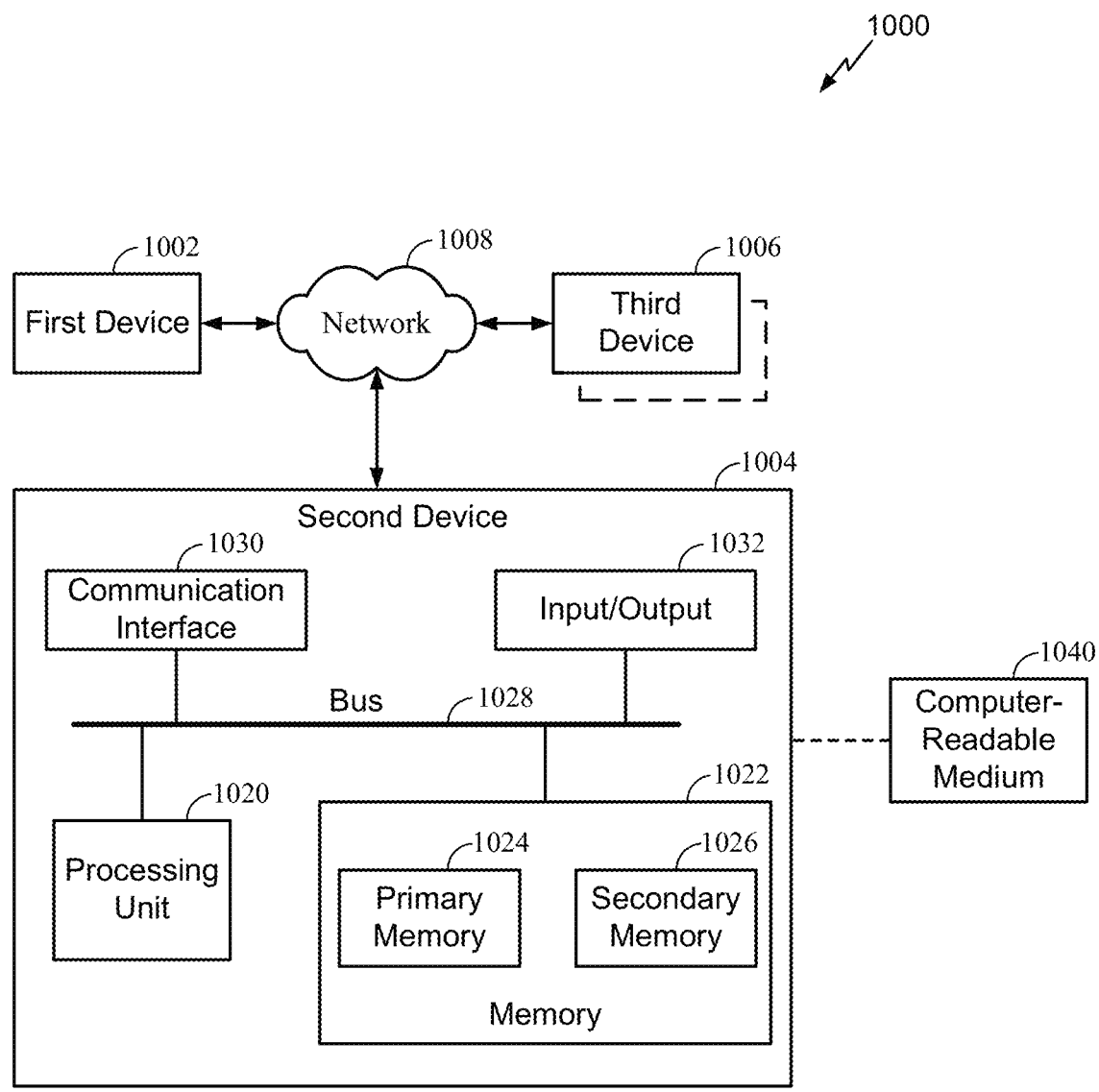
FIG. 11 is a schematic block diagram of an example computing device, in accordance with an embodiment.

In one example embodiment, as shown in FIG. 11, a system embodiment may comprise a local network (e.g., device 1004 and medium 1040) and/or another type of network, such as a computing and/or communications network. For purposes of illustration, therefore, FIG. 11 shows an embodiment 1000 of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may, for example, comprise one or more client computing devices and/or one or more server computing device. By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 11 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-10, for example, and in the text associated with the foregoing figure(s) of the present patent application.

An embodiment in accordance with claimed subject matter may include a method of executing computer instructions on at least one computing device without further human interaction in which the at least one computing device includes at least one processor and at least one memory. An embodiment may include fetching computer instructions from the at least one memory of the at least one computing device for execution on the at least one processor of the at least one computing device, executing the fetched computer instructions on the at least one processor of the at least one computing device, and storing in the at least one memory of the at least one computing device any results of having executed the fetched computer instructions on the at least one processor of the at least one computing device. In an embodiment, the computer instructions to be executed comprise instructions for processing content representative of a behavioral and/or biological state of a particular user, wherein executing the fetched instructions further includes tracking, via at least one processor, signals and/or states representative of behavioral profile content for a particular user, wherein the behavioral profile content includes a plurality of parameters representative of a current behavioral state or biological state, or a combination thereof, of the particular user, storing the tracked signals and/or states representative of the behavioral content in at least one memory, and determining, at least in part via the at least one processor performing one or more machine learning operations, one or more relationships between the tracked behavioral profile content and bioavailability or balance, or a combination thereof, of one or more particular substances within the particular user's body.

In other embodiments, computer instructions to be executed comprise instructions for processing content for transmission or receipt of messages, generating attention heatmaps and/or generating/updating a DSAL, wherein executing the fetched instructions further includes via at least one processor, initiating transmission of content in messages, processing content in received messages, generating attention heatmaps from sensor input signals and/or generating/updating a DSAL.

In an embodiment, an apparatus may include at least one computing device, the at least one computing device including at least one processor and at least one memory, the at least one computing device to execute computer instructions on the at least one processor without further human intervention. In an embodiment, the computer instructions to be executed may be fetched from the at least one memory for execution on the at least one processor, and the at least one computing device may store in the at least one memory of the at least one computing device any results to be generated from the execution on the at least one processor of the to be executed computer instructions.

In an embodiment, the computer instructions to be executed may include instructions to process content representative of a behavioral and/or biological state of a particular subject. In an embodiment, the at least one processor may track signals and/or states representative of behavioral profile content for a particular subject, the behavioral profile content to include a plurality of parameters representative of a current behavioral state or biological state, or a combination thereof, of the particular user, the at least one memory to store the tracked signals and/or states representative of the behavioral content, wherein the at least one processor to perform one or more machine learning operations to determine one or more relationships between the tracked behavioral profile content and bioavailability or balance, or a combination thereof, of one or more particular substances within the particular subject's body.

Additionally, in an embodiment, at least one processor may further generate and/or update parameters to be included in a DSAL. Further, the at least one processor may generate and/or update such parameters to be included in an DSAL based, at least in part, on behavioral profile content for a particular subject and an attention heatmap temporally correlated with such behavioral profile content. In an embodiment, such behavioral profile content and/or attention heatmap may be based, at least in part, on measurements of eye movement for the subject.

Further, in an embodiment, to perform one or more machine learning operations, at least one processor may perform one or more training operations to be based at least in part on input to be obtained from one or more sensors. In an embodiment, input to be obtained from one or more sensors may include measurements obtained from sensors 940, for example. Additionally, training operations performed by one or more processors may also base such training operations on parameters 950, 952 and/or 954.

Referring now again to FIG. 11, in an embodiment, first and third devices 1002 and 1006 may be capable of rendering a graphical user interface (GUI) for a network device and/or a computing device, for example, so that a user-operator may engage in system use. Device 1004 may potentially serve a similar function in this illustration. Likewise, in FIG. 11, computing device 1002 ('first device' in figure) may interface with computing device 1004 ('second device' in figure), which may, for example, also comprise features of a client computing device and/or a server computing device, in an embodiment.

Processor (e.g., processing device) 1020 and memory 1022, which may comprise primary memory 1024 and secondary memory 1026, may communicate by way of a communication bus 1015, for example. The term "computing device," in the context of the present patent application, refers to a system and/or a device, such as a computing apparatus, that includes a capability to process (e.g., perform computations) and/or store digital content, such as electronic files, electronic documents, parameters, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 11, is merely one example, and claimed subject matter is not limited in scope to this particular example. According to an embodiment, features of computing device 1004 may be embedded in smart glasses 100, and computing devices associated with matching entity 502, wearing entity 504 and/or requesting entity 506. As pointed out above, such computing devices to implement smart glasses 100 and/or computing device associated with wearing entity 504 may also include an image capture device (e.g., a CMOS imager, readout circuitry and/or circuitry to process pixel signals for storage in a storage medium), sensors capable of monitoring environmental conditions and/or sensors capable of monitoring physiological processes (e.g., as in sensors 940). In another particular implementation, processing unit 1020 may comprise a general processing central processing unit (CPU) and/or one or more co-processing units such as, for example, a BPU (e.g., BPU 920), a neural network processing unit (NPU), a graphics processing unit (GPU), just to provide a few examples of co-processing units.

As mentioned, for one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 11, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 11 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a computer-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 11 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

One example embodiment is directed to a method comprising: disposing one or more surface markers in and/or on a marked surface to provide one or more signals that are detectable by a mobile device, the one or more signals to define an area of the marked surface to be automatically image captured by an imaging device of the mobile device responsive to the one or more signals, the area of the surface to be captured comprising a subset of a field of view of the imaging device. In one particular implementation, the one or more signals further comprise cropping instructions based, at least in part, on a boundary of the marked surface. In another particular implementation, the imaging device may be capable of inhibiting and/or preventing capture of an image in a field of view of the image device in a memory device based, at least in part, on a machine-learning rejection filter. For example, the machine-learning rejection filter may be capable of detecting a feature of a live human in the field of view of the image device, and inhibiting and/or prevent capture of the image in the memory device responsive to detection of the feature of the live human in the field of view of the image device. In yet another particular implementation, the one or more surface markers comprise one or more visual markings, and wherein the one or more signals may be received at an image capture device of the mobile device. In yet another particular implementation, the one or more signals are further indicative of a unique identifier to be associated with the marked surface. In another particular implementation, the mobile device comprises spectacles/glasses. In yet another particular implementation, the spectacles/glasses are responsive to voice commands to associate a name and/or label with the captured image.

Another example embodiment is directed to a mobile worn device comprising: a receiver capable of receiving signals provided by one or more surface markers disposed in and/or on a marked surface; and one or more processors to automatically change an operational mode of the mobile worn device responsive to receipt of the one or more signals. In one particular implementation, the marked surface is associated with a particular environmental context, and wherein the operational mode is automatically changed to, at least in part, adapt the mobile worn device to the particular environmental context. In another particular implementation, a change in the operational mode of the mobile device may comprise a change in: a noise cancelling mode; a passthrough amplification mode; a power mode; one or more parameters of one or more machine-learning models; or to a silent mode, or a combination thereof.

Another example embodiment is directed to an article comprising a non-transitory storage medium, the storage medium comprising computer-readable instructions stored thereon which are executable by one or more processors of a mobile device to automatically change an operational mode of the mobile device responsive to receipt of one or more signals provided by one or more surface markers disposed in and/or on a marked surface. In one particular implementation, the marked surface is associated with a particular environmental context, and wherein the operational mode is automatically changed to, at least in part, adapt the mobile worn device to the particular environmental context. In another particular implementation, a change in the operational mode of the mobile device may comprise a change in: a noise cancelling mode; a passthrough amplification mode; a power mode; one or more parameters of one or more machine-learning models; or to a silent mode, or a combination thereof.

Another example embodiment is directed to an article comprising a non-transitory storage medium comprising computer-readable instructions stored thereon which are executable by one or more processors at a mobile device to: obtain one or more signals received at the mobile device and provided by one or more surface markers disposed in and/or on a marked surface; and responsive to receipt of the one or more signals, automatically initiate capture of an image of at least a portion the surface specified by the one or more signals. In one particular implementation, the computer-readable instructions may be further executable by the one or more processors to automatically crop the image based, at least in part, on the one or more signals, the cropped image corresponding to a boundary of the marked surface. In another particular implementation, the computer-readable instructions may be further executable by the one or more processors to inhibit and/or prevent storage of the image in a memory based, at least in part, on a machine-learning rejection filter. For example, such storage of the image in the memory may be inhibited and/or prevented responsive, at least in part, to detection by the machine-learning rejection filter of a feature of a live human in the image. In another particular implementation, visual content presented within the surface changes dynamically over time, and wherein the signals provided by the one or more surface markers change based on changes in the presented visual content, thereby initiating changes in processing of the automatically captured image at an image capture device. In an example, the signals provided by the one or more surface markers disposed in and/or on the marked surface may initiate changes in processing of the automatically captured image based, at least in part, on changes in the presented visual content. In another example, the signals provided by the one or more surface markers are to affect compression of the captured image at the image capture device. In another example, signals provided by the one or more surface markers disposed in and/or on the marked surface are to indicate change points in the presented visual content of the captured image. In another implementation, the one or more signals indicate a unique identifier associated with the marked surface. In yet another implementation, the mobile worn device may be responsive to voice commands to associate a name and/or label with the captured image.

Another example embodiment disclosed herein is directed to an article comprising a non-transitory storage medium, the storage medium comprising computer-readable instructions stored thereon that are executable by one or more processors to: obtain one or more messages received at a computing device from a first party device to specify an order for delivery of one or more images of at least a portion of a marked surface; and initiate transmission of one or more messages to one or more second party devices to communicate the order for delivery of the one or more images to a party associated with the first party device, wherein the second party device is to automatically capture the one or more images of the marked surface responsive to receipt of one or more signals from one or more surface markers disposed on and/or in the marked surface. In one particular implementation, the portion of the marked surface is defined, at least in part, by the one or more signals provided by the one or more surface markers. In another particular implementation, the one or more messages from the first party device and the one or more signals comprise a unique identifier associated with the marked surface. In yet another particular implementation, the one or more messages to indicate compensation for delivery of the one or more images indicate a bounty for capture and delivery of the one or more images. In yet another particular implementation, the computer-readable instructions are further executable by the one or more processors to obtain one or more messages received from at least one of the one or more second party devices comprising an image and metadata; validate the image based, at least in part, on the metadata; and selectively enable delivery of the image to the first party device responsive to validation of the image, validation of the image to be based, at least in part, on the metadata. In one example, the metadata includes a unique identifier of the surface and a location identifier. In another example, the one or more messages to the one or more second party devices further specify one or more requirements for the one or more images, and wherein the computer-readable instructions are further executable by the one or more processors, responsive to determination that the image meets the one or more requirements, to: selectively enable delivery of the image to the first party device; and selectively enable payment of compensation to the second party responsive to determination that the image meets the one or more requirements. In another example, such one or more requirements may specify a time window.

Another embodiment disclosed herein is directed to a computing device comprising: an image capture device; a receiver device to receive messages from a communication network; and one or more processors to: obtain one or more messages received at the receiver device from a device specifying one or more attributes of an order from a requesting party for delivery of a captured image of a marked surface, the one or more attributes comprising a unique identifier of the marked surface, the marked surface being remote from a location of the requesting party; and initiate automatic capture of an image of the surface responsive at least in part to one or more signals provided by one or more surface markers disposed in and/or on the marked surface. In one particular implementation, the attributes of the order indicate an identifier of the marked surface, and wherein the one or more signals provided by the one or more surface markers disposed in and/or on the marked surface indicate the identifier of the marked surface. In another particular implementation, wherein the image capture device is integrated with a pair of smart glasses, and wherein the automatic capture of the image may further comprise capture of the image of the surface at an responsive to recognition of at least one visual command in the one or more signals provided by the one or more surface markers disposed in and/or on the surface.

Another embodiment disclosed herein is directed to an article comprising a non-transitory storage medium, the storage medium comprising computer-readable instructions stored thereon that are executable by one or more processors of a computing device to: obtain one or more messages received from a device specifying one or more attributes of an order from a requesting party for delivery of a captured image of a marked surface, the one or more attributes comprising a unique identifier of the marked surface, the marked surface to be remote from a location of the requesting party; and initiate automatic capture of an image of the surface responsive at least in part to one or more signals provided by one or more surface markers disposed in and/or on the marked surface. In one particular implementation, the attributes of the order indicate an identifier of the marked surface, and wherein the one or more signals provided by the one or more surface markers disposed in and/or on the marked surface indicate the identifier of the marked surface. In another particular implementation, the automatic capture of the image may further comprise capture of the image of the surface responsive to recognition of at least one visual command in the one or more signals provided by the one or more surface markers disposed in and/or on the surface.

Another embodiment disclosed herein is directed to a method comprising: transmitting one or more messages from a first device to a second device specifying one or more attributes of an order for delivery of a captured image of a surface that is remote from a location of the first device, the one or more attributes to include at least an identifier of the surface; and receiving one or more images of the marked surface captured by a third device, the one or more images of the marked surface being captured by the third device responsive to one or more signals provided by one or more surface markers disposed in and/or on the marked surface, the one or more signals indicating the identifier of the marked surface. In one particular implementation, the one or more attributes of the order specifying a compensation value to be provided in exchange for delivery of the one or more images of the surface being captured by the third device.

Another embodiment disclosed herein is directed to a first device comprising: a receiver device to receive messages from a communication network; a transmitter device to transmit messages to the communication network; and one or more processors to: initiate transmission of one or more messages through the transmitter device to a second device specifying one or more attributes of an order for delivery of a captured image of a surface that is remote from a location of the first device, the one or more attributes to include at least an identifier of the surface; and obtain one or more images of the marked surface captured by a third device, the one or more images of the marked surface to captured by the third device responsive to one or more signals provided by one or more surface markers disposed in and/or on the marked surface, the one or more signals indicating the identifier of the marked surface. In one particular implementation, the one or more attributes of the order specifying a compensation value to be provided in exchange for delivery of the one or more images of the surface being captured by the third device.

Another embodiment disclosed herein is directed to an article comprising a non-transitory storage medium, the storage medium comprising computer-readable instructions stored thereon which are executable by one or more processors of a first device to: initiate transmission of one or more messages to a second device specifying one or more attributes of an order for delivery of a captured image of a surface that is remote from a location of the first device, the one or more attributes to include at least an identifier of the surface; and obtain one or more images of the marked surface captured by a third device, the one or more images of the marked surface to captured by the third device responsive to one or more signals provided by one or more surface markers disposed in and/or on the marked surface, the one or more signals indicating the identifier of the marked surface. In one particular implementation, the one or more attributes of the order may specify a compensation value to be provided in exchange for delivery of the one or more images of the surface being captured by the third device.

Another embodiment disclosed herein is directed to an article comprising a non-transitory storage medium comprising computer-readable instructions stored thereon that are executable by one or more processors to: detect a presence of a marked surface within a field of view of a subject; and obtain observations of one or more physiological and/or behavioral processes of the subject contemporaneously with the presence of the marked surface within the field of view of the subject. In a particular implementation, the instructions are further executable by the one or more processors to generate behavior profile content based, at least in part, on the obtained observations. Additionally, the instructions may be further executable by the one or more processors to: project a gaze of the subject over at least a portion of the marked surface onto projected locations of visual content presented by the marked surface; and create one or more records of the at least some of the behavioral profile content in association with the projected locations of the visual content. In another particular implementation, the instructions may be further executable by the one or more processors to automatically detect the presence of the marked surface within the field of view of the subject responsive to one or more signals provided by one or more surface markers disposed on and/or in the marked surface. In one example, the instructions may be further executable by the one or more processors to temporally associate at least some of the visual content with the projected locations of the image, and wherein at least some of the one or more records comprise the at least some of the behavioral profile content in temporal association with the projected locations of the visual content. In another particular implementation, observations of the one or more physiological and/or behavioral processes of the subject contemporaneously with the detected presence of the marked surface within the field of view of the subject further comprises commencing obtaining the one or more physiological and/or behavioral processes of the subject responsive to one or more signals provided by one or more surface markers disposed on and/or in the marked surface. For example, the one or more signals provided by the one or more surface markers comprise a request offering compensation in exchange for one or more records comprising the obtained observations and/or behavioral content determined based, at least in part, on the obtained observations. In another implementation, the instructions are further executable by the one or more processors to initiate transmission of one more messages to a requesting party comprising the one or more records. In another particular implementation, the instructions are further executable by the one or more processors to commence obtaining the observations of the one or more physiological and/or behavioral processes of the subject responsive to one or more signals provided by one or more surface markers disposed on and/or in the marked surface occurs automatically responsive to application of one or more pre-established rules. In another particular implementation, the instructions are further executable by the one or more processors process signals from one or more eye-tracking sensors embedded in smart glasses worn by the subject to track the gaze of the subject. In another particular implementation, the instructions are further executable by the one or more processors to generate behavior profile content based, at least in part, on one or more signals generated by one or more sensors worn by the subject. For example, the instructions may be further executable by the one or more processors to generate a time-stamped attention heatmap associating a tracked gaze over the portions of the marked surface, and temporally associate the time-stamped attention heatmap and the behavioral profile content to update a detailed surface attention log (DSAL) associated with the marked surface. In another particular implementation, the instructions may be further executable by the one or more processors to generate and/or update the DSAL associated with the marked surface based, at least in part, on the attention heatmap and behavioral profile content determined based, at least in part, on the observations of the one or more physiological and/or behavioral processes. In an implementation, the DSAL may further comprise metadata; captured image content; at least a portion of the attention heatmap or the behavioral profile content, or a combination thereof. Here, such metadata may comprise: a unique identifier associated with the surface; a user account identifier associated with the subject; a timestamp corresponding to a time that an image of a surface is captured; location identification parameters; or demographic descriptors of the subject, or a combination thereof.

Another embodiment disclosed herein is directed to a method comprising: receiving one or more messages from a device worn by a subject, at least one of the messages comprising one or more records of behavioral profile content, the behavioral profile content generated from observations of physiological and/or behavioral processes of the subject, in temporal association with projected locations on a marked surface of a gaze of the subject onto the marked surface; and processing the one or more records to alter a visual appearance of the marked surface based, at least in part, on the behavioral profile content in temporal association with the projected locations on the marked surface.

Another embodiment disclosed herein is directed to a computing device comprising a receiver device to receive messages from a communication network; and a processor to one or more messages received at the receiver device from a device worn by a subject, at least one of the messages comprising one or more records of behavioral profile content, the behavioral profile content generated from observations of physiological and/or behavioral processes of the subject in temporal association with projected locations on a marked surface of a gaze of the subject onto the marked surface; and process the one or more records to alter a visual appearance of the marked surface based, at least in part, on the behavioral profile content in temporal association with the projected locations on the marked surface.

Another embodiment disclosed herein is directed to an article comprising a non-transitory storage medium computing computer-readable instructions stored thereon that are executable by one or more processors to: obtain one or more messages received from a device worn by a subject, at least one of the messages to comprise one or more records of behavioral profile content, the behavioral profile content generated from observations of physiological and/or behavioral processes of the subject in temporal association with projected locations on a marked surface of a gaze of the subject onto the marked surface; and process the one or more records to alter a visual appearance of the marked surface based, at least in part, on the behavioral profile content in temporal association with the projected locations on the marked surface.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   detecting a presence of a marked surface within a field of view of a subject;
   obtaining observations of one or more physiological and/or behavioral processes of the subject using one or more sensors contemporaneously with detecting the presence of the marked surface within the field of view of the subject by generating behavior profile content based, at least in part, on one or more signals generated by one or more sensors worn by the subject;
   generating a time-stamped attention heatmap associating a projected gaze of the subject over portions of the marked surface; and
   temporally associating the time-stamped attention heatmap and the behavioral profile content to update a detailed surface attention log (DSAL) associated with the marked surface.

2. The method of claim 1, and further comprising generating behavior profile content based, at least in part, on the obtained observations.

3. The method of claim 2, and further comprising:
   projecting a gaze of the subject over at least a portion of the marked surface onto projected locations of visual content presented by the marked surface; and
   creating one or more records of the at least some of the behavioral profile content in association with the projected locations of the visual content.

4. The method of claim 3, and further comprising:
temporally associating at least some of the visual content with the projected locations, and wherein at least some of the one or more records comprise the at least some of the behavioral profile content in temporal association with the projected locations of the visual content.

5. The method of claim 3, wherein projecting the gaze of the subject further comprises processing signals from one or more eye-tracking sensors embedded in smart glasses worn by the subject.

6. The method of claim 1, wherein detecting the presence of the marked surface within the field of view of the subject further comprises automatically detecting the presence of the marked surface within the field of view of the subject responsive to one or more signals provided by one or more surface markers disposed on and/or in the marked surface.

7. The method of claim 1, wherein obtaining observations of the one or more physiological and/or behavioral processes of the subject contemporaneously with the presence of the marked surface within the field of view of the subject comprises commencing obtaining the one or more physiological and/or behavioral processes of the subject responsive to one or more signals provided by one or more surface markers disposed on and/or in the marked surface.

8. The method of claim 6, wherein the one or more signals provided by the one or more surface markers comprise a request offering compensation in exchange for one or more records comprising the behavioral profile content determined based, at least in part, on the obtained observations.

9. The method of claim 8, and further comprising transmitting one more messages to a requesting party comprising the one or more records.

10. The method of claim 7, wherein commencing obtaining the one or more physiological and/or behavioral process of the subject responsive to one or more signals provided by one or more surface markers disposed on and/or in the marked surface occurs automatically responsive to application of one or more pre-established rules.

11. The method of claim 1, and further comprising generating and/or updating the DSAL associated with the marked surface based, at least in part, on the time-stamped attention heatmap and behavioral profile content determined based, at least in part, on the observations of the one or more physiological and/or behavioral processes.

12. The method of claim 11, wherein the DSAL further comprises:
metadata;
captured image content;
at least a portion of the time-stamped attention heatmap; or
the behavioral profile content, or a combination thereof.

13. The method of claim 12, wherein the metadata comprises:
a unique identifier associated with the marked surface;
a user account identifier associated with the subject;
a timestamp corresponding to a time that an image of a surface is captured; location identification parameters; or demographic descriptors of the subject, or a combination thereof.

14. A mobile device comprising:
one or more sensors; and
one or more processors to:
detect a presence of a marked surface within a field of view of a subject based at least in part on receipt of one or more trigger signals; and
obtain observations of one or more physiological and/or behavioral processes of the subject based, at least in part, on signals generated by at least one of the one or more sensors contemporaneously with detecting the presence of the marked surface withing the field of view of the subject, the observations to comprise behavioral profile content generated based, at least in part, on the signals generated by the at least one of the one or more sensors;
generate a time-stamped attention heatmap associating a projected gaze of the subject over portions of the marked surface; and
temporally associate the time-stamped attention heatmap and the behavioral profile content to update a detailed surface attention log (DSAL) associated with the marked surface.

15. The mobile device of claim 14, wherein the one or more processors are further to:
project a gaze of the subject over at least a portion of the marked surface onto projected locations of visual content presented by the marked surface; and
create one or more records of the at least some of the behavioral profile content in association with the projected locations of the visual content.

16. The mobile device of claim 14, wherein the one or more processors are further to automatically detect the presence of the marked surface within the field of view of the subject responsive to one or more signals provided by one or more surface markers disposed on and/or in the marked surface.

17. A method comprising:
receiving one or more messages from a device worn by a subject in response to detection of a marked surface within a field of view of the subject, at least one of the messages comprising one or more records of behavioral profile content, the behavioral profile content generated from observations of physiological and/or behavioral processes of the subject obtained using one or more sensors, in temporal association with projected locations on a marked surface of a gaze of the subject onto the marked surface;
generating a time-stamped attention heatmap associating a projected gaze of the subject over portions of the marked surface;
temporally associating the time-stamped attention heatmap and the behavioral profile content to update a detailed surface attention log (DSAL) associated with the marked surface; and
processing the one or more records to alter a visual appearance of the marked surface based, at least in part, on the DSAL.

* * * * *